(12) United States Patent
Noda et al.

(10) Patent No.: US 7,649,956 B2
(45) Date of Patent: Jan. 19, 2010

(54) MODULATION AND DEMODULATION SYSTEM, MODULATOR, DEMODULATOR AND PHASE MODULATION METHOD AND PHASE DEMODULATION METHOD USED THEREFOR

(75) Inventors: Seiichi Noda, Tokyo (JP); Shinichi Koike, Tokyo (JP)

(73) Assignee: NEC Corporation, Tokyo (JP)

( * ) Notice: Subject to any disclaimer, the term of this patent is extended or adjusted under 35 U.S.C. 154(b) by 664 days.

(21) Appl. No.: 11/255,577

(22) Filed: Oct. 21, 2005

(65) Prior Publication Data

US 2006/0088127 A1   Apr. 27, 2006

(30) Foreign Application Priority Data

Oct. 27, 2004 (JP) ............................. 2004-311660
May 24, 2005 (JP) ............................. 2005-150289

(51) Int. Cl.
*H04L 27/10* (2006.01)
*H04L 27/18* (2006.01)

(52) U.S. Cl. ................. 375/279; 375/308; 375/329

(58) Field of Classification Search ............. 375/259, 375/279, 329, 283, 308
See application file for complete search history.

(56) References Cited

U.S. PATENT DOCUMENTS 3,553,368 A * 1/1971 Rudolph ............... 375/281
3,866,147 A * 2/1975 De Couvreur et al. ..... 341/57
3,993,862 A * 11/1976 Karr ..................... 358/426.01
4,553,130 A * 11/1985 Kato ..................... 341/67

FOREIGN PATENT DOCUMENTS

| JP | 53-147454  | 12/1987 |
| JP | 2003-060721 | 2/2003  |
| JP | 2003-110644 | 4/2003  |
| JP | 2003-204316 | 7/2003  |
| JP | 2003-204365 | 7/2003  |
| JP | 2004-129013 | 4/2004  |

OTHER PUBLICATIONS

Yoichi Saito, "Modulation and Demodulation of Digital Wireless Communication", Institute of Electronics, Information and Communication Engineers, Feb. 1996.
S. Noda, et al., "Performance and application of PSK modulation whose number of phases is not a power of 2", Proceeding of ISITA '02, Xi'an, pp. 239-242 (Oct. 2002).

* cited by examiner

*Primary Examiner*—Chieh M Fan
*Assistant Examiner*—Qutbuddin Ghulamali
(74) *Attorney, Agent, or Firm*—Scully, Scott, Murphy & Presser, P.C.

(57) ABSTRACT

A modulation and demodulation system capable of minimizing a bit error rate in a six-phase phase modulation method. A senary signal phase-modulated and outputted by a modulator is received and phase-modulated by a destination demodulator to a binary signal before conversion by the modulator. The modulator assigns (0, 0), (0, 1), (0, 2), (1, 2), (1, 1) and (1, 0) which are senary signals ($b_i$, $t_i$) to first to sixth phases respectively. The demodulator performs a conversion process from the senary signals to the binary signals, for instance, by storing transmitted senary signals and sequentially converting every senary signal of length m to binary signal of length b so as to output them. The process of the demodulator assigns the first to sixth phases as the senary signals ($b_i$, $t_i$) to (0, 0), (0, 1), (0, 2), (1, 2), (1, 1) and (1, 0) respectively.

39 Claims, 14 Drawing Sheets

FIG. 2A

ENCODING OF SENARY SIGNALS

| PHASE | ENCODING (Bi, Ti) |
|---|---|
| 0 | (0, 0) |
| 1 | (0, 1) |
| 2 | (0, 2) |
| 3 | (1, 2) |
| 4 | (1, 1) |
| 5 | (1, 0) |

FIG. 2B

ENCODING OF BINARY SIGNALS

| BINARY (b4, b3) | BINARY (B1, B0) |
|---|---|
| (0, 0) | (0, 0) |
| (0, 1) | (0, 1) |
| (1, 1) | (1, 1) |
| (1, 0) | (1, 0) |

FIG. 2C

ENCODING OF TERNARY SIGNALS

| BINARY (b2, b1, b0) | BINARY (T1, T0) |
|---|---|
| (0, 0, 0) | (0, 0) |
| (0, 0, 1) | (0, 1) |
| (0, 1, 0) | (0, 2) |
| (1, 1, 0) | (1, 1) |
| (1, 1, 1) | (1, 1) |
| (0, 1, 1) | (1, 2) |
| (1, 0, 0) | (2, 0) |
| (1, 0, 1) | (2, 1) |

(NOTE) b4, b3, b2, b1 AND b0 ARE BINARY SIGNALS OF INPUT
IN Bi AND Ti, i MEANS i-TH SYMBOL
Bi AND Ti ARE ENCODED BINARY AND TERNARY SIGNALS RESPECTIVERY

| | SENARY SIGNAL | | BINARY SIGNAL | | | | | ERROR IN h1 (HAMMING DISTANCE) | | ERROR IN h0 | |
|---|---|---|---|---|---|---|---|---|---|---|---|
| | h1 | h0 | b4 | b3 | b2 | b1 | b0 | +1 | −1 | +1 | −1 |
| 1 | 0 | 0 | 0 | 0 | 0 | 0 | 0 | 2 | 2 | 1 | 3 |
| 2 | 0 | 1 | 0 | 0 | 0 | 0 | 1 | 2 | 2 | 1 | 1 |
| 3 | 0 | 2 | 0 | 0 | 0 | 1 | 1 | 4 | 2 | 1 | 1 |
| 4 | 0 | 3 | 0 | 0 | 0 | 1 | 0 | 4 | 2 | 1 | 1 |
| 5 | 0 | 4 | 0 | 0 | 1 | 1 | 0 | 2 | 0 | 1 | 1 |
| 6 | 0 | 5 | 0 | 0 | 1 | 1 | 1 | 2 | 0 | 3 | 1 |
| 7 | 1 | 0 | 0 | 0 | 1 | 0 | 1 | 4 | 2 | 1 | 3 |
| 8 | 1 | 1 | 0 | 0 | 1 | 0 | 0 | 4 | 2 | 1 | 1 |
| 9 | 1 | 2 | 0 | 1 | 1 | 0 | 0 | 2 | 4 | 1 | 1 |
| 10 | 1 | 3 | 0 | 1 | 1 | 0 | 1 | 2 | 4 | 1 | 1 |
| 11 | 1 | 4 | 0 | 1 | 1 | 1 | 1 | 4 | 2 | 1 | 1 |
| 12 | 1 | 5 | 0 | 1 | 1 | 1 | 0 | 4 | 2 | 3 | 1 |
| 13 | 2 | 0 | 0 | 1 | 0 | 1 | 0 | 2 | 4 | 1 | 3 |
| 14 | 2 | 1 | 0 | 1 | 0 | 1 | 1 | 2 | 4 | 1 | 1 |
| 15 | 2 | 2 | 0 | 1 | 0 | 0 | 1 | 4 | 2 | 1 | 1 |
| 16 | 2 | 3 | 0 | 1 | 0 | 0 | 0 | 4 | 2 | 1 | 1 |
| 17 | 2 | 4 | 1 | 1 | 0 | 0 | 0 | 2 | 4 | 1 | 1 |
| 18 | 2 | 5 | 1 | 1 | 0 | 0 | 1 | 2 | 4 | 3 | 1 |
| 19 | 3 | 0 | 1 | 1 | 0 | 1 | 1 | 4 | 2 | 1 | 3 |
| 20 | 3 | 1 | 1 | 1 | 0 | 1 | 0 | 4 | 2 | 1 | 1 |
| 21 | 3 | 2 | 1 | 1 | 1 | 1 | 0 | 2 | 4 | 1 | 1 |
| 22 | 3 | 3 | 1 | 1 | 1 | 1 | 1 | 2 | 4 | 1 | 1 |
| 23 | 3 | 4 | 1 | 1 | 1 | 0 | 1 | 3 | 2 | 1 | 1 |
| 24 | 3 | 5 | 1 | 1 | 1 | 0 | 0 | 0 | 2 | 3 | 1 |
| 25 | 4 | 0 | 1 | 0 | 1 | 0 | 0 | 2 | 4 | 3 | 1 |
| 26 | 4 | 1 | 1 | 0 | 1 | 0 | 1 | 2 | 4 | 1 | 1 |
| 27 | 4 | 2 | 1 | 0 | 1 | 1 | 1 | 4 | 2 | 1 | 1 |
| 28 | 4 | 3 | 1 | 0 | 1 | 1 | 0 | 2 | 2 | 0 | 1 |
| 29 | 5 | 0 | 1 | 0 | 0 | 1 | 0 | 2 | 4 | 3 | 3 |
| 30 | 5 | 1 | 1 | 0 | 0 | 1 | 1 | 2 | 4 | 1 | 1 |
| 31 | 5 | 2 | 1 | 0 | 0 | 0 | 1 | 2 | 2 | 1 | 1 |
| 32 | 5 | 3 | 1 | 0 | 0 | 0 | 0 | 2 | 2 | 3 | 1 |
| | | | | | | | | TOTAL 85 | 84 | TOTAL 45 | 42 |

NON-TRANSMITTER SIGNAL

| h1 | h0 | b4 | b3 | b2 | b1 | b0 |
|---|---|---|---|---|---|---|
| 4 | 4 | 1 | 0 | 1 | 1 | 0 |
| 4 | 5 | 1 | 1 | 1 | 0 | 0 |
| 5 | 4 | 0 | 0 | 1 | 1 | 0 |
| 5 | 5 | 0 | 0 | 1 | 1 | 1 |

AVERAGE Hamming DISTANCE = 2.00

FIG. 10A

ENCODING OF SENARY SIGNALS

| PHASE | ENCODING (Bi, Ti) |
|---|---|
| 0 | (0, 0) |
| 1 | (0, 1) |
| 2 | (0, 2) |
| 3 | (1, 2) |
| 4 | (1, 1) |
| 5 | (1, 0) |

FIG. 10B

ENCODING OF BINARY SIGNALS

| BINARY (b4) | BINARY (B1) |
|---|---|
| 0 | 0 |
| 1 | 1 |

| BINARY (b3) | BINARY (B2) |
|---|---|
| 0 | 0 |
| 1 | 1 |

FIG. 10C

ENCODING OF TERNARY SIGNALS

| BINARY (b2, b1, b0) | TERNARY (T1, T2) |
|---|---|
| (0, 0, 0) | (0, 0) |
| (0, 0, 1) | (0, 1) |
| (0, 1, 1) | (0, 2) |
| (0, 1, 0) | (1, 2) |
| (1, 1, 0) | (2, 2) |
| (1, 1, 1) | (2, 1) |
| (1, 0, 1) | (2, 0) |
| (1, 0, 0) | (1, 1) |

(NOTE) b4, b3, b2, b1 AND b0 ARE BINARY SIGNALS OF INPUT
IN Bi AND Ti, i MEANS i-TH SYMBOL
Bi AND Ti ARE ENCODED BINARY AND TERNARY SIGNALS RESPECTIVERY

FIG. 11A
FIRST ENCODING OF TERNARY SIGNALS
| TERNARY (T1, T0) | BINARY (b2, b1, b0) |
|---|---|
| ( 0, 0 ) | ( 0, 0, 0 ) |
| ( 0, 1 ) | ( 0, 0, 1 ) |
| ( 0, 2 ) | ( 0, 1, 1 ) |
| ( 1, 2 ) | ( 0, 1, 0 ) |
| ( 2, 2 ) | ( 1, 1, 0 ) |
| ( 2, 1 ) | ( 1, 1, 1 ) |
| ( 2, 0 ) | ( 1, 0, 1 ) |
| ( 1, 1 ) | ( 1, 0, 0 ) |
FIG. 11C
SECOND ENCODING OF TERNARY SIGNALS
| TERNARY (T1, T0) | BINARY (b2, b1, b0) |
|---|---|
| ( 0, 0 ) | ( 0, 0, 0 ) |
| ( 0, 1 ) | ( 0, 1, 0 ) |
| ( 0, 2 ) | ( 0, 1, 1 ) |
| ( 1, 2 ) | ( 1, 1, 1 ) |
| ( 2, 2 ) | ( 1, 1, 0 ) |
| ( 2, 1 ) | ( 1, 0, 0 ) |
| ( 2, 0 ) | ( 1, 0, 1 ) |
| ( 1, 1 ) | ( 0, 0, 1 ) |
FIG. 11B
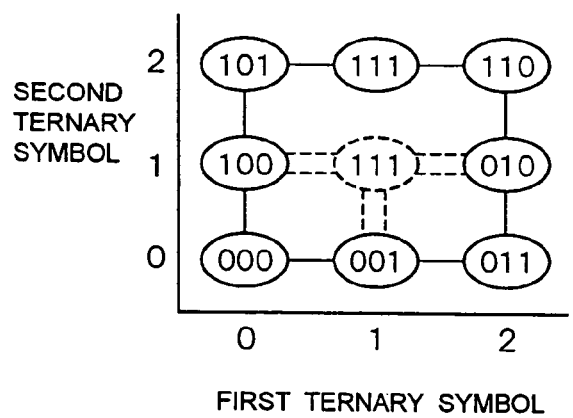
FIG. 11D
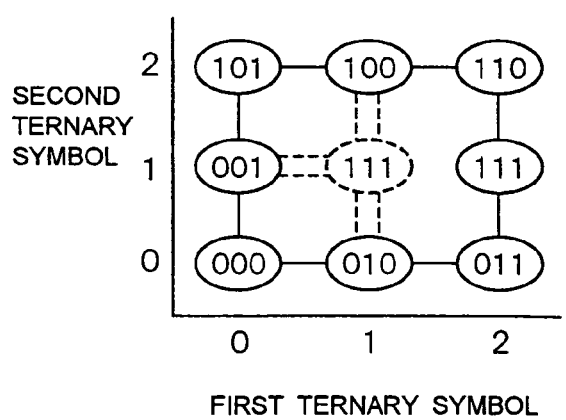

ENCODING OF TERNARY SIGNALS
BY RELATED TECHNIQUE

| TERNARY (T1, T0) | BINARY (b2, b1, b0) |
|---|---|
| ( 0, 0 ) | ( 0, 0, 0 ) |
| ( 0, 1 ) | ( 0, 0, 1 ) |
| ( 0, 2 ) | ( 0, 1, 0 ) |
| ( 1, 0 ) | ( 1, 1, 0 ) |
| ( 1, 1 ) | ( 1, 1, 1 ) |
| ( 1, 2 ) | ( 0, 1, 1 ) |
| ( 2, 0 ) | ( 1, 0, 0 ) |
| ( 2, 1 ) | ( 1, 0, 1 ) |

ENCODING OF TERNARY SIGNALS BY GRAY ENCODING

| TERNARY (T1, T0) | BINARY (b2, b1, b0) |
|---|---|
| ( 0, 0 ) | ( 0, 0, 0 ) |
| ( 0, 1 ) | ( 0, 0, 1 ) |
| ( 0, 2 ) | ( 0, 1, 1 ) |
| ( 1, 0 ) | ( 0, 1, 0 ) |
| ( 1, 1 ) | ( 1, 1, 0 ) |
| ( 1, 2 ) | ( 1, 1, 1 ) |
| ( 2, 0 ) | ( 1, 0, 1 ) |
| ( 2, 1 ) | ( 1, 0, 0 ) |

MODULATION AND DEMODULATION SYSTEM, MODULATOR, DEMODULATOR AND PHASE MODULATION METHOD AND PHASE DEMODULATION METHOD USED THEREFOR

BACKGROUND OF THE INVENTION

1. Field of the Invention

The present invention relates to a modulation and demodulation system, a modulator, a demodulator and a phase modulation method and a phase demodulation method used therefor, and in particular, to encoding for minimizing a bit error per a symbol error in a modulation demodulation method for transmitting a binary signal of predetermined length b correspondingly to a senary phase signal of predetermined length m against a predetermined integral value N other than power of 2, and encoding for minimizing the bit error per the symbol error in the modulation and demodulation method for transmitting a binary signal of length "5" correspondingly to a senary phase signal of length "2."

2. Description of the Prior Art

Conventionally, $2^n$ phase modulation is used with n as a positive integer in two-phase phase modulation (Binary Phase Shift Keying: BPSK), four-phase phase modulation (Quadrature Phase Shift Keying: QPSK), eight-phase phase modulation and so on especially in the cases of digital phase modulation used for digital microwave communication, satellite communication, mobile communication and so on.

As for the digital microwave communication, satellite communication, mobile communication and so on, the $2^n$ phase modulation is generally used with n as a positive integer in the two-phase phase modulation, four-phase phase modulation, eight-phase phase modulation and so on for the reason of simplicity of circuitry and consistency with a binary signal.

To meet requests for effective utilization of transmission power and frequencies, the $2^n$ phase modulation method is generally used as a modulation technology (refer to "Modulation and Demodulation of Digital Wireless Communication" (Yoichi Saito, Institute of Electronics, Information and Communication Engineers, February 1996), for instance). It is possible, as to these modulation methods, to minimize a bit error per symbol error by using the encoding well known as gray encoding.

Difficulties in implementation due to complicated circuitry are gradually alleviated by advancements in integrated circuit technology in recent years. Furthermore, the requests for effective utilization of frequencies and transmission power are becoming stronger.

As for a phase shift keying technology not rendering a phase number as $2^n$, propositions are made as to configurations of three-phase, five-phase, six-phase and seven-phase phase shift keying modulations (refer to S. Noda, K. Nakamura and K. Koga, "Performance and application of PSK modulation whose number of phases is not a power of 2," Proceeding of ISITA' 02, Xi' an, pp239 to 242, October 2002., for instance). In the case of the three-phase phase modulation, disclosure is made as to a configuration method thereof (refer to Japanese Patent Laid-Open Nos. 53-147454, 2003-060721, 2003-110644, for instance) and an encoding method for minimizing a bit error (refer to Japanese Patent Laid-Open No. 2004-129013 and S. Noda, K. Nakamura and K. Koga, "Performance and application of PSK modulation whose number of phases is not a power of 2," Proceeding of ISITA' 02, Xi' an, pp239 to 242, October 2002., for instance). Disclosure is also made as to a technology relating to error-correction coding of the six-phase phase modulation (refer to Japanese Patent Laid-Open Nos. 2003-204365 and 2003-204316, for instance).

Furthermore, regarding the three-phase phase modulation, disclosure is made as to the configuration method (refer to Japanese Patent Laid-Open Nos. 53-147454, 2003-060721, 2003-110644 and Japanese Patent Laid-Open No. 53-147454, 2003-060721, 2003-110644, for instance) and the encoding method for minimizing a bit error (refer to Japanese Patent Laid-Open No. 2004-129013 and S. Noda, K. Nakamura and K. Koga, "Performance and application of PSK modulation whose number of phases is not a power of 2," Proceeding of ISITA' 02, Xi' an, pp239 to 242, October 2002., for instance). A proposition is also made by the applicant hereof as to an encoding method for improving the error rate of the six-phase phase modulation.

For this reason, in the case of n=2 in the $2^n$ phase modulation for instance, it is the four-phase phase modulation. To minimize the bit error per symbol error, it requires encoding for minimizing the Hamming distance between adjacent signal points considering that errors predominantly occur at the adjacent signal points under a thermal noise environment. The gray encoding is well known for the sake of meeting this request.

In the case of applying the gray encoding to the six-phase phase modulation, however, there is a problem that the bit error is not minimized per the symbol error. It is because, while a physical error occurs between adjacent signal points, a Hamming distance between the signal points of the symbol is dependent on the other symbols of correlated symbols. Consequently, there is a problem that the six-phase phase modulation applied conventional coding such as gray coding has an inferior error rate characteristic. As for the six-phase phase modulation, the encoding method for minimizing a bit error per symbol error is yet to be clarified.

Thus, an object of the present invention is to provide the modulation and demodulation system, modulator, demodulator and phase modulation method and phase demodulation method used therefor capable of solving the problem and minimizing the bit error rate in the six-phase phase modulation method.

Another object of the present invention is to provide the modulation and demodulation system, modulator, demodulator and phase modulation method and phase demodulation method used therefor capable of simplifying a circuit configuration in the six-phase phase modulation method.

BRIEF SUMMARY OF THE INVENTION

A modulation and demodulation system according to the present invention is the one for having a senary phase shift keying modulation transmitting binary signal and phase shift keying demodulation recovering binary signal, wherein:

the modulator has data conversion means for converting a binary signal of length b to a senary signal of length m;

the data conversion means includes conversion means for converting a binary signal of length b−m to a ternary signal of length m; and first to sixth phases are expressed as (B, T) by using binary signal B and ternary signal T, which are (0, 0), (0, 1), (0, 2), (1, 2), (1, 1) and (1, 0) respectively.

Another modulation and demodulation system according to the present invention is the one for having a senary phase shift keying modulation transmitting binary signal and phase shift keying demodulation recovering binary signal, wherein:

the demodulator has data conversion means for converting a senary signal of length m to a binary signal of length b;

the data conversion means includes conversion means for converting a ternary signal of length m to a binary signal of length b−m; and first to sixth phases are senary signals expressed as (B, T) by using binary signal B and ternary signal T, which are assigned to (0, 0), (0, 1), (0, 2), (1, 2), (1, 1) and (1, 0) respectively.

A modulator according to the present invention is the one for phase-modulating a binary signal to a senary signal and outputting it, comprising:

data conversion means for converting a binary signal of length b to a senary signal of length m, wherein:

the data conversion means includes conversion means for converting a binary signal of length b−m to a ternary signal of length m; and first to sixth phases are expressed as (B, T) by using binary signal B and ternary signal T, and are (0, 0), (0, 1), (0, 2), (1, 2), (1, 1) and (1, 0) respectively.

A demodulator according to the present invention is the one for receiving a senary signal phase-modulated and phase-demodulating it to a binary signal before conversion by the modulator, wherein:

it has data conversion means for converting a senary signal of length m to a binary signal of length b;

the data conversion means includes conversion means for converting a ternary signal of length m to a binary signal of length b−m; and first to sixth phases are assigned to (0, 0), (0, 1), (0, 2), (1, 2), (1, 1) and (1, 0) respectively as senary signals expressed as (B, T) by using binary signal B and ternary signal T.

A phase modulation method according to the present invention is the one used for a modulation and demodulation system for having a senary phase shift keying modulation transmitting binary signal and phase shift keying demodulation recovering binary signal, wherein:

the modulator implements a data conversion process for converting a binary signal of length b to a senary signal of length m;

the data conversion process includes a conversion process for converting a binary signal of length b−m to a ternary signal of length m; and first to sixth phases are expressed as (B, T) by using binary signal B and ternary signal T, which are (0, 0), (0, 1), (0, 2), (1, 2), (1, 1) and (1, 0) respectively.

A phase demodulation method according to the present invention is the one used for a modulation and demodulation system for having a senary phase shift keying modulation transmitting binary signal and phase shift keying demodulation recovering binary signal, wherein:

the demodulator implements a data conversion process for converting a senary signal of length m to a binary signal of length b;

the data conversion process includes a conversion process for converting a ternary signal of length m to a binary signal of length b−m; and first to sixth phases are assigned to (0, 0), (0, 1), (0, 2), (1, 2), (1, 1) and (1, 0) respectively as senary signals expressed as (B, T) by using binary signal B and ternary signal T.

Another phase modulation method according to the present invention is the one for, with b as an integer and m as an integer approximately equal to and larger than $b/\log_2 6$, converting a binary signal of length b to a senary signal of length m and transmitting a binary signal correspondingly to a senary phase signal, wherein:

a data conversion process for converting the binary signal of length b to the senary signal of length m includes a process for converting a binary signal of length b−m to a ternary signal of length m; and first to sixth phases are expressed as (B, T) by using binary signal B and ternary signal T, which are (0, 0), (0, 1), (0, 2), (1, 2), (1, 1) and (1, 0) respectively.

To be more specific, the modulation and demodulation system according to the present invention is the one for, with b as an integer and m as an integer approximately equal to and larger than $b/\log_2 6$, converting a binary signal of length b to a senary signal of length m and transmitting a binary signal correspondingly to a senary phase signal, wherein:

a data conversion portion for converting the binary signal of length b to the senary signal of length m converts a binary signal of length b−m to a ternary signal of length m; and first to sixth phases are expressed as (B, T) by using binary signal B and ternary signal T, which are (0, 0), (0, 1), (0, 2), (1, 2), (1, 1) and (1, 0) respectively.

When converting the binary signal of length b−m to the ternary signal of length m, it associates the binary signal of length b−m with the ternary signal of length m to reduce a mean error rate of each bit of the binary signal of length b−m corresponding to all the errors of the Lee distance 1 of the ternary signal of length m so as to convert the binary signal of length b to the senary signal of length m.

When converting the binary signal of length b−m to the ternary signal of length m, with b=5, m=2, the data conversion portion converts the binary signal of length 3 to the ternary signal of length 2 as a correspondence between the binary signal of length 3 and the ternary signal of length 2 according to a conversion rule for assigning one of the following four sets to a set of the eight ternary signals of length 2 ((0, 0), (0, 1), (0, 2), (1, 0), (1, 1), (1, 2), (2, 0) and (2, 1)) with the eight binary signals of length 3 as a set:

((0, 0, 0), (0, 0, 1), (0, 1, 1), (1, 1, 0), (1, 1, 1), (0, 1, 0), (1, 0, 0) and (1, 0, 1)), ((0, 0, 0), (0, 0, 1), (0, 1, 0), (1, 1, 0), (1, 1, 1), (0, 1, 1), (1, 0, 0) and (1, 0, 1)), ((0, 0, 0), (0, 1, 1), (0, 0, 1), (1, 0, 0), (1, 1, 1), (1, 0, 1), (0, 1, 0) and (1, 1, 0)) and ((0, 0, 0), (0, 1, 1), (0, 0, 1), (1, 0, 0), (1, 1, 1), (1, 0, 1), (1, 1, 0) and (0, 1, 0)).

Furthermore, the data conversion portion for converting the binary signal of length 3 to the ternary signal of length 2 according to the conversion rule of the four sets adds the binary signals of length 3 (v2, v1, v0) [(v2, v1, v0) is one of (0, 0, 1), (0, 1, 0), (0, 1, 1), (1, 0, 0), (1, 0, 1), (1, 1, 0) and (1, 1, 1)] to the binary signals of length 3 (b2, b1, b0) respectively to assign each bit as (b2+v2, b1+v1, b0+v0) (symbol of operation + is an exclusive OR) to the ternary signals of length 2 ((0, 0), (0, 1), (0, 2), (1, 0), (1, 1), (1, 2), (2, 0) and (2, 1) so as to convert the binary signals of length 3 to the ternary signals of length 2.

Furthermore, as a conversion rule between the ternary signals of length 2 and the binary signals of length 3 according to the conversion rule of the four sets, the data conversion portion replaces each bit of the binary signals (b2, b1, b0) as to thirty-two sets having converted the above-mentioned four sets from the binary signals of length 3 to the ternary signals of length 2 to assign each bit as (b2, b0, b1), (b1, b0, b2), (b1, b2, b0), (b0, b0, b2) and (b0, b2, b1) to the ternary signals of length 2 ((0, 0), (0, 1), (0, 2), (1, 0), (1, 1), (1, 2), (2, 0) and (2, 1) so as to convert the binary signals of length 3 to the ternary signals of length 2.

In six-phase phase modulation, the data conversion portion for converting the binary signal of length b to the senary signal of length m includes means for converting the binary signal of length b−m to the ternary signal of length m, and the first to sixth phases are expressed as (B, T) by using binary signal B and ternary signal T, which are (0, 0), (0, 1), (0, 2), (1, 2), (1, 1) and (1, 0) so as to render Hamming distances between (0, 2) and (1, 2) and between (1, 0) and (0, 0) as 1. Therefore, in the six-phase phase modulation, the Hamming distances are smaller compared to the case of (0, 0), (0, 1), (0, 2), (1, 0), (1, 1), (1, 2) so that the bit error rate can be reduced.

The means for converting the binary signal of length b−m to the ternary signal of length m associates the binary signal of length b−m with the ternary signal of length m to reduce the mean error rate of each bit of the binary signal of length b−m corresponding to all the errors of Lee distance 1 of the ternary signal of length m. Thus, the Hamming distances are smaller between (0, 0) and (0, 1), between (0, 1) and (0, 2), between (1, 2) and (1, 1) and between (1, 1) and (1, 0) respectively so that the bit error rate can be reduced.

The modulation and demodulation system according to the present invention is the one for having data conversion for converting a binary signal of length 5 to a senary signal of length 2 performed by a modulator to send it as a senary phase modulation signal and having the senary phase modulation signal received and inversely converted by a demodulator to the binary signal before the conversion by the modulator, wherein:

means for performing the data conversion has conversion means for converting a binary signal of length 3 to a ternary signal of length 2;

first to sixth phases are expressed as (B, T) by using binary signal B and ternary signal T, which are (0, 0), (0, 1), (0, 2), (1, 2), (1, 1) and (1, 0) respectively;

the ternary signals of length 2 are annularly arranged to be an error of a Lee distance 1 in every adjacent combination, and the binary signals of length 3 are associated with the ternary signals of length 2 so as to render a Hamming distance between the binary signals of length 3 as 1; and the means for performing the data conversion converts the binary signal of length 5 to the senary signal of length 2 by using a correspondence between the binary signal of length 3 and the ternary signal of length 2.

The modulator according to the present invention is the one used for a modulation and demodulation system for having data conversion for converting a binary signal of length 5 to a senary signal of length 2 performed by a modulator to send it as a senary phase modulation signal and having the senary phase modulation signal received and inversely converted by a demodulator to the binary signal before the conversion by the modulator, wherein:

means for performing the data conversion has conversion means for converting a binary signal of length 3 to a ternary signal of length 2;

first to sixth phases are expressed as (B, T) by using binary signal B and ternary signal T, which are (0, 0), (0, 1), (0, 2), (1, 2), (1, 1) and (1, 0) respectively;

the ternary signals of length 2 are annularly arranged to be an error of a Lee distance 1 in every adjacent combination, and the binary signals of length 3 are associated with the ternary signals of length 2 so as to render a Hamming distance between the binary signals of length 3 as 1; and the means for performing the data conversion converts the binary signal of length 5 to the senary signal of length 2 by using a correspondence between the binary signal of length 3 and the ternary signal of length 2.

The demodulator according to the present invention is the one used for a modulation and demodulation system for having data conversion for converting a binary signal of length 5 to a senary signal of length 2 performed by a modulator to send it as a senary phase modulation signal and having the senary phase modulation signal received and inversely converted by the demodulator to the binary signal before the conversion by the modulator, wherein:

means for inversely converting the senary phase modulation signal to the binary signal includes conversion means for converting a ternary signal of length 2 to a binary signal of length 3;

first to sixth phases are expressed as (B, T) by using binary signal B and ternary signal T, which are (0, 0), (0, 1), (0, 2), (1, 2), (1, 1) and (1, 0) respectively;

the ternary signals of length 2 are annularly arranged to be an error of a Lee distance 1 in every adjacent combination, and the binary signals of length 3 are associated with the ternary signals of length 2 so as to render a Hamming distance between the binary signals of length 3 as 1; and the means for inversely converting the senary phase modulation signal to the binary signal inversely converts the senary phase modulation signal to the binary signal before the conversion by the modulator by using a correspondence between the binary signal of length 3 and the ternary signal of length 2.

The phase modulation method according to the present invention is the one used for a modulation and demodulation system for having a senary signal phase-modulated and outputted by a modulator received and phase-modulated by a destination demodulator to a binary signal before conversion by the modulator, wherein:

the modulator performs a data conversion process for converting a binary signal of length 5 to a senary signal of length 2;

the data conversion process includes a conversion process for converting a binary signal of length 3 to a ternary signal of length 2;

first to sixth phases are expressed as (B, T) by using binary signal B and ternary signal T, which are (0, 0), (0, 1), (0, 2), (1, 2), (1, 1), (1, 0) respectively;

the ternary signals of length 2 are annularly arranged to be an error of a Lee distance 1 in every adjacent combination, and the binary signals of length 3 are associated with the ternary signals of length 2 so as to render a Hamming distance between the binary signals of length 3 as 1; and the data conversion process converts the binary signal of length 5 to the senary signal of length 2 by using a correspondence between the binary signal of length 3 and the ternary signal of length 2.

The phase demodulation method according to the present invention is the one used for a modulation and demodulation system for having data conversion for converting a binary signal of length 5 to a senary signal of length 2 performed by a modulator to send it as a senary phase modulation signal and having the senary phase modulation signal received and inversely converted by a demodulator to the binary signal before the conversion by the modulator, wherein:

the demodulator implements an inverse conversion process for inversely converting the senary phase modulation signal to the binary signal before the conversion by the modulator;

the inverse conversion process includes a conversion process for converting a ternary signal of length 2 to a binary signal of length 3;

first to sixth phases are expressed as (B, T) by using binary signal B and ternary signal T, which are (0, 0), (0, 1), (0, 2), (1, 2), (1, 1) and (1, 0) respectively;

the ternary signals of length 2 are annularly arranged to be an error of a Lee distance 1 in every adjacent combination, and the binary signals of length 3 are associated with the ternary signals of length 2 so as to render a Hamming distance between the binary signals of length 3 as 1; and the inverse conversion process inversely converts the senary phase modulation signal to the binary signal before the conversion by the modulator by using a correspondence between the binary signal of length 3 and the ternary signal of length 2.

To be more specific, the modulation and demodulation system according to the present invention is the one for having data conversion for converting a binary signal of length "5" to a senary signal of length "2" performed by a modulator to send it as a senary phase modulation signal and having the senary phase modulation signal received and inversely converted by a demodulator to the binary signal before the conversion by the modulator, wherein: means for performing the data conversion has conversion means for converting a binary signal of length "3" to a ternary signal of length "2"; first to sixth phases are expressed as (B, T) by using binary signal B and ternary signal T, which are (0, 0), (0, 1), (0, 2), (1, 2), (1, 1) and (1, 0) respectively; the ternary signals of length "2" are annularly arranged to be an error of a Lee distance 1 in every adjacent combination, and the binary signals of length "3" are associated with the ternary signals of length "2" so as to render a Hamming distance between the binary signals of length "3" as 1; and the means for performing the data conversion converts the binary signal of length "5" to the senary signal of length "2" by using a correspondence between the binary signal of length "3" and the ternary signal of length "2."

The modulator according to the present invention is the one used for a system for having data conversion for converting a binary signal of length "5" to a senary signal of length "2" performed by a modulator to send it as a senary phase modulation signal and having the senary phase modulation signal received and inversely converted by a demodulator to the binary signal before the conversion by the modulator, wherein: means for performing the data conversion includes conversion means for converting a binary signal of length "3" to a ternary signal of length "2"; first to sixth phases are expressed as (B, T) by using binary signal B and ternary signal T, which are (0, 0), (0, 1), (0, 2), (1, 2), (1, 1) and (1, 0) respectively; the ternary signals of length "2" are annularly arranged to be an error of a Lee distance 1 in every adjacent combination, and the binary signals of length "3" are associated with the ternary signals of length "2" so as to render a Hamming distance between the binary signals of length "3" as 1; and the means for performing the data conversion converts the binary signal of length "5" to the senary signal of length "2" by using that correspondence.

The demodulator according to the present invention is the one used for a system for having data conversion for converting a binary signal of length "5" to a senary signal of length "2" performed by a modulator to send it as a senary phase modulation signal and having the senary phase modulation signal received and inversely converted by the demodulator to the binary signal before the conversion by the modulator, wherein: the demodulator implements an inverse conversion process for inversely converting the senary phase modulation signal to the binary signal; the inverse conversion process includes conversion process for converting a ternary signal of length "2" to a binary signal of length "3"; first to sixth phases are expressed as (B, T) by using binary signal B and ternary signal T, which are (0, 0), (0, 1), (0, 2), (1, 2), (1, 1) and (1, 0) respectively; the ternary signals of length "2" are annularly arranged to be an error of a Lee distance 1 in every adjacent combination, and the binary signals of length "3" are associated with the ternary signals of length "2" so as to render a Hamming distance between the binary signals of length "3" as 1; and the inverse conversion process inversely converts the senary phase modulation signal to the binary signal before the conversion by using that correspondence.

The phase modulation method according to the present invention is the one used for a modulation and demodulation system for having data conversion for converting a binary signal of length "5" to a senary signal of length "2" performed by a modulator to send it as a senary phase modulation signal and having the senary phase modulation signal received and inversely converted by a demodulator to the binary signal before the conversion by the modulator, wherein: the modulator implements a data conversion process for converting a binary signal of length "5" to a senary signal of length "2"; the data conversion process includes a conversion process for converting a binary signal of length "3" to a ternary signal of length "2"; first to sixth phases are expressed as (B, T) by using binary signal B and ternary signal T, which are (0, 0), (0, 1), (0, 2), (1, 2), (1, 1) and (1, 0) respectively; the ternary signals of length "2" are annularly arranged to be an error of a Lee distance 1 in every adjacent combination, and the binary signals of length "3" are associated with the ternary signals of length 2 so as to render a Hamming distance between the binary signals of length "3" as 1; and the data conversion process converts the binary signal of length "5" to the senary signal of length "2" by using that correspondence.

The phase demodulation method according to the present invention is the one used for a modulation and demodulation system for having data conversion for converting a binary signal of length "5" to a senary signal of length "2" performed by a modulator to send it as a senary phase modulation signal and having the senary phase modulation signal received and inversely converted by a demodulator to the binary signal before the conversion by the modulator, wherein: the demodulator implements an inverse conversion process for inversely converting the senary phase modulation signal to the binary signal; the inverse conversion process includes a conversion process for converting a ternary signal of length "2" to a binary signal of length "3"; first to sixth phases are expressed as (B, T) by using binary signal B and ternary signal T, which are (0, 0), (0, 1), (0, 2), (1, 2), (1, 1) and (1, 0) respectively; the ternary signals of length "2" are annularly arranged to be an error of a Lee distance 1 in every adjacent combination, and the binary signals of length "3" are associated with the ternary signals of length 2 so as to render a Hamming distance between the binary signals of length "3" as 1; and the inverse conversion process inversely converts the senary phase modulation signal to the binary signal before the conversion by the modulator by using that correspondence.

In the conversion, the binary signal of length "3" is converted to the ternary signal of length "2" as a correspondence between the binary signal of length "3" and the ternary signal of length "2" according to a conversion rule for assigning one of the following two sets to a set of the eight ternary signals of length "2" ((0, 0), (0, 1), (0, 2), (1, 2), (2, 2), (2, 1), (2, 0) and (1, 0)) with the eight binary signals of length "3" as a set:

((0, 0, 0), (0, 0, 1), (0, 1, 1), (0, 1, 0), (1, 1, 0), (1, 1, 1), (1, 0, 1) and (1, 0, 0)) and ((0, 0, 0), (1, 0, 0), (1, 0, 1), (1, 1, 1), (1, 1, 0), (0, 1, 0), (0, 1, 1) and (0, 0, 1)).

Furthermore, according to the conversion rule, the conversion means adds the binary signals of length 3 (v2, v1, v0) [(v2, v1, v0) is one of (0, 0, 1), (0, 1, 0), (0, 1, 1), (1, 0, 0), (1, 0, 1), (1, 1, 0) and (1, 1, 1)] to the binary signals of length 3 (b2, b1, b0) respectively to assign each bit as (b2+v2, b1+v1, b0+v0) (symbol of operation + is an exclusive OR) to the senary signals of length 2 (0, 0), (0, 1), (0, 2), (1, 2), (2, 2), (1, 2), (0, 2) and (0, 1) so as to convert the binary signals of length 3 to the ternary signals of length 2 or the ternary signal of length "2" to the binary signals of length 3 according to the conversion rule.

Furthermore, according to the conversion rule, the conversion means replaces each bit of the binary signals (b2, b1, b0) to assign each bit as (b2, b0, b1), (b1, b0, b2), (b1, b2, b0), (b0, b0, b2) and (b0, b2, b1) to sixteen sets converted from the binary signals of length "3" to the ternary signals of length "2" so as to convert the binary signals of length "3" to the ternary signals of length "2" or the ternary signal of length "2" to the binary signals of length 3 according to the conversion rule.

Thus, the modulation and demodulation system of the present invention can minimize the bit error rate in the six-phase phase modulation method and also simplify the circuit configuration in the six-phase phase modulation method.

The modulation and demodulation system of the present invention can have the effect of minimizing the bit error rate in the six-phase phase modulation method by having the configuration and operation described hereunder.

The other modulation and demodulation system of the present invention can have the effect of simplifying the circuit configuration in the six-phase phase modulation by having the following configuration and operation.

BRIEF DESCRIPTION OF THE DRAWINGS

FIG. 2 are diagrams showing an encoding process according to the first embodiment of the present invention;

FIG. 3 is a diagram showing a Hamming distance from an adjacent signal point in encoding according to the first embodiment of the present invention;

FIG. 4 is a diagram showing the Hamming distance from the adjacent signal point in gray encoding according to the first embodiment of the present invention:

FIGS. 10A to 10C are diagrams showing the encoding process according to the second embodiment of the present invention;

FIGS. 11A to 11D are diagrams showing the Hamming distance from the adjacent signal point in the encoding according to the second embodiment of the present invention;

DETAILED DESCRIPTION OF THE PREFERRED EMBODIMENTS

Figure 1:
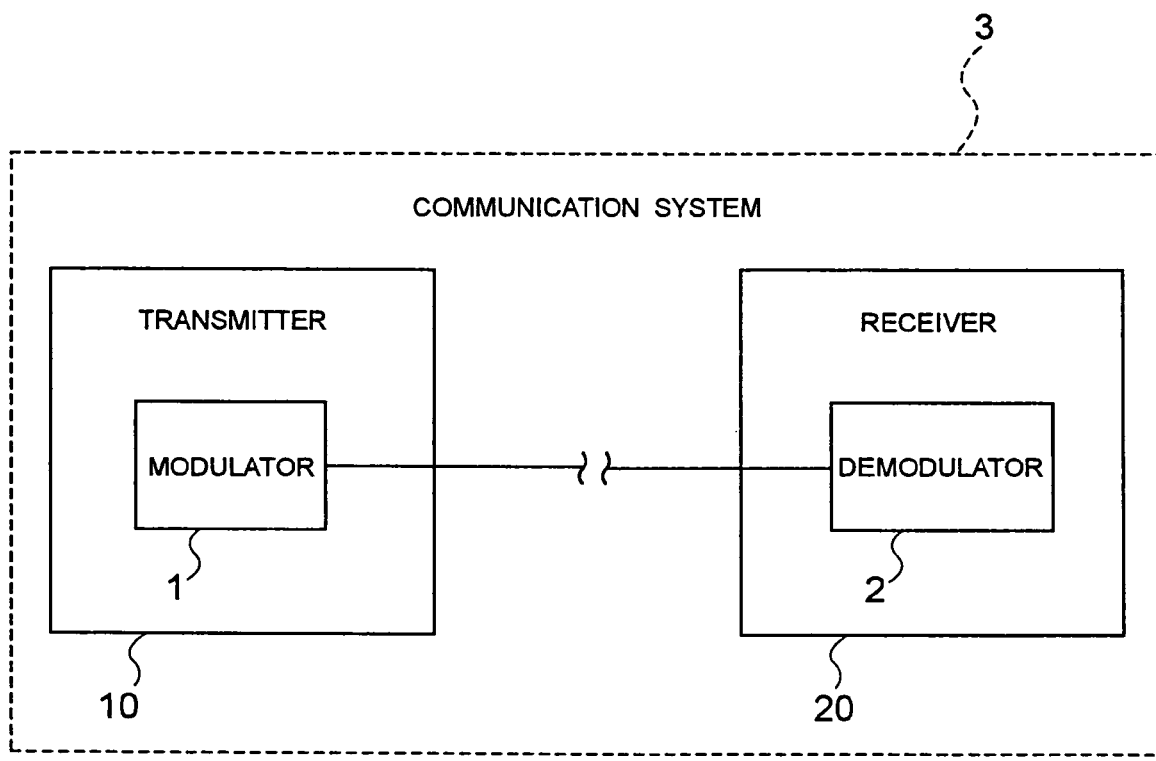
FIG. 1 is a block diagram showing a configuration of a modulation and demodulation system according to first and second embodiments of the present invention.

Next, a first embodiment of the present invention will be described by referring to the drawings. FIG. 1 is a block diagram showing a configuration of a modulation and demodulation system (communication system) according to the first embodiment of the present invention. In FIG. 1, a communication system 3 according to this embodiment is configured by a transmitter 10 having a modulator 1 mounted thereon and a receiver 20 having a demodulator 2 mounted thereon.

A senary signal phase-modulated and outputted by the modulator 1 is received and phase-modulated by the demodulator 2 at a destination to a binary signal before conversion by the modulator 1. In this process of the modulator 1, as described above, (0, 0), (0, 1), (0, 2), (1, 2), (1, 1) and (1, 0) as senary signals ($b_i$, $t_i$) are assigned to first to sixth phases respectively.

The conversion of the senary signal to the binary signal by the demodulator 2 can be implemented as with the modulator 1 of the first embodiment of the present invention. For instance, it is possible to store transmitted senary signals and sequentially convert them to the binary signal of length b so as to output them by senary signal of length m.

In this process of the demodulator 2, the first to sixth phases are assigned as senary signals ($b_i$, $t_i$) to (0, 0), (0, 1), (0, 2), (1, 2), (1, 1) and (1, 0) respectively.

Figure 3:
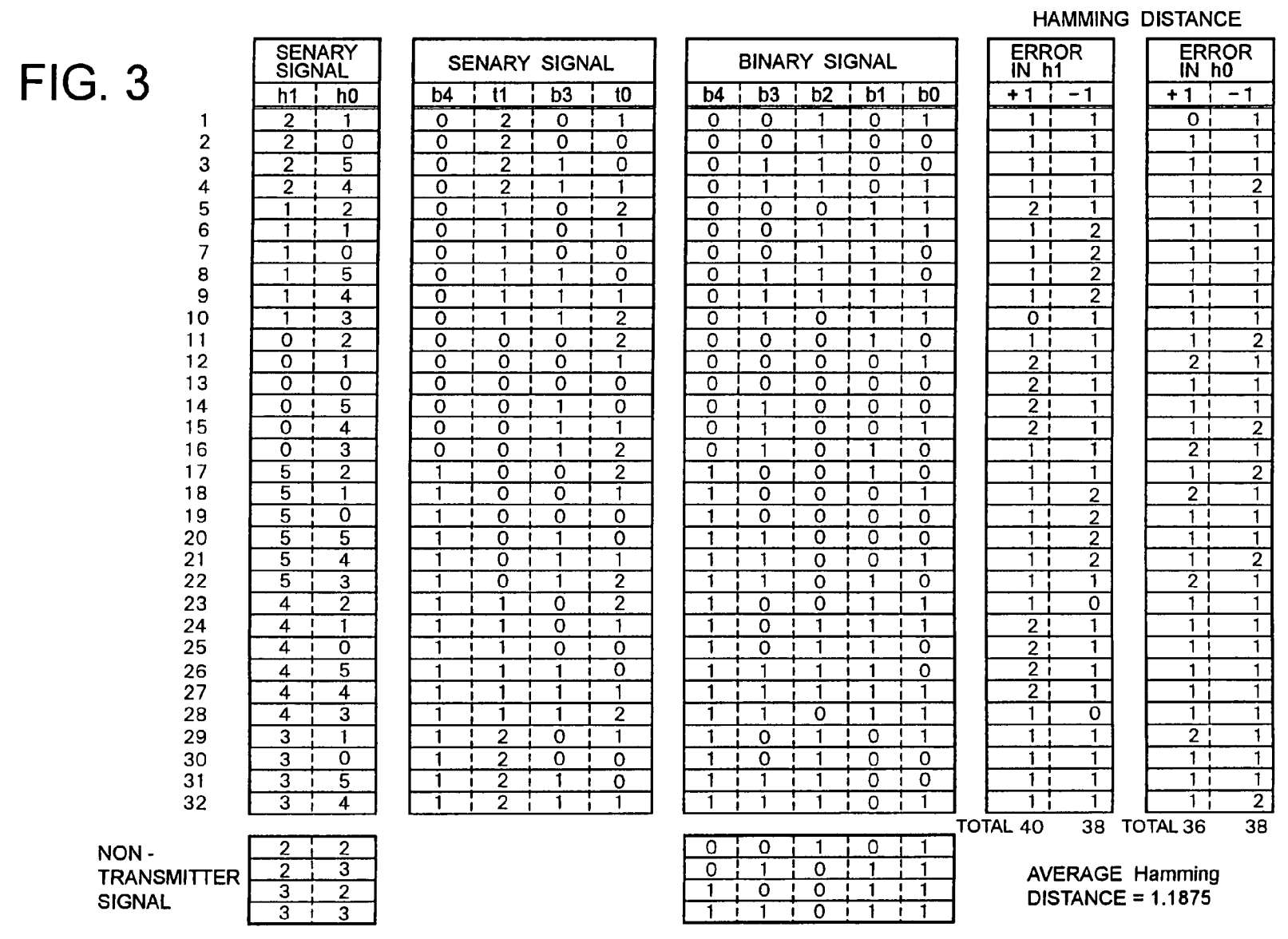
Figure 5:
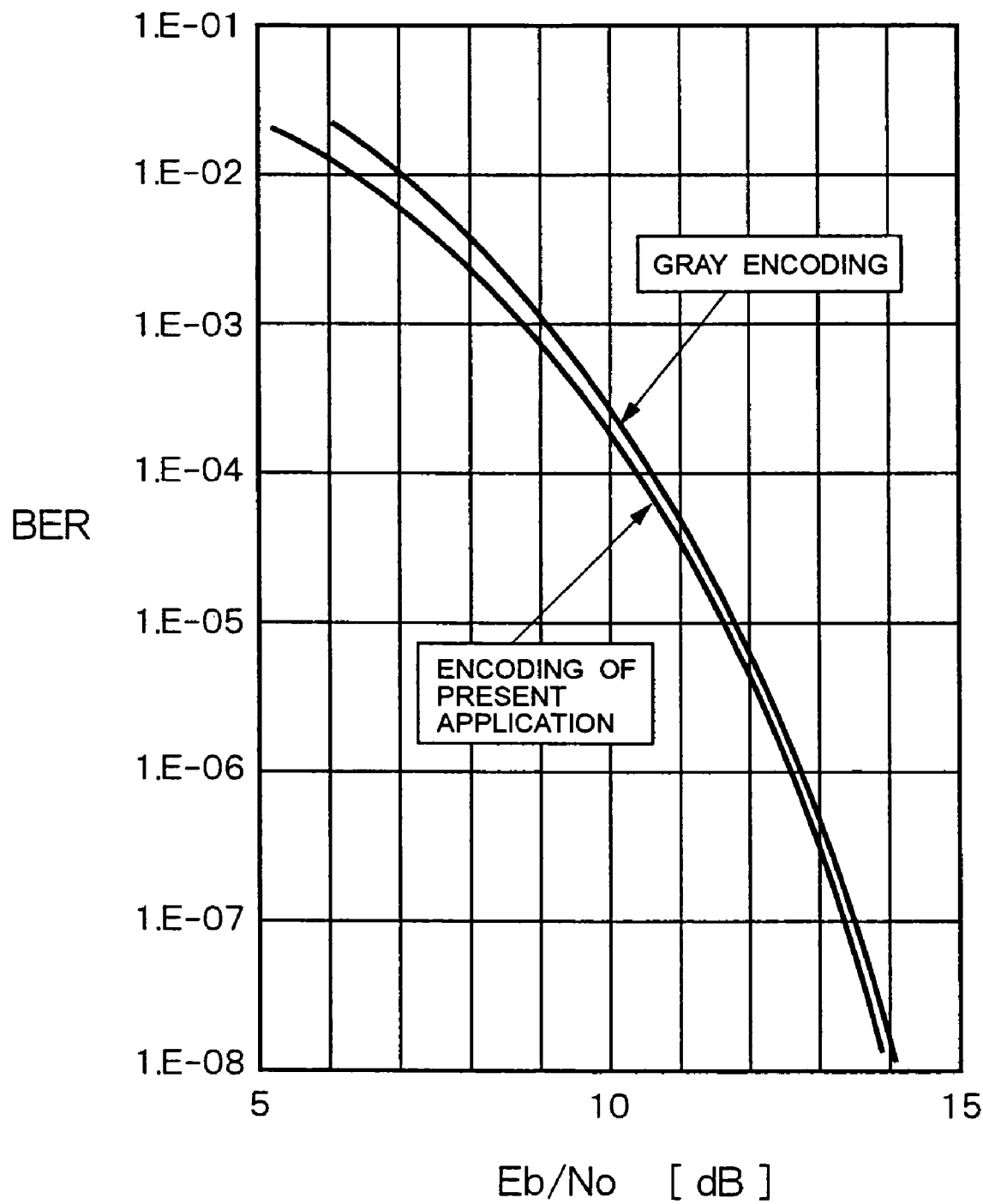
FIG. 5 is a diagram showing comparison of an error rate characteristic according to the first embodiment of the present invention

FIGS. 2A to 2C are diagrams showing an encoding process according to the first embodiment of the present invention, FIG. 3 is a diagram showing a Hamming distance from an adjacent signal point in encoding according to the first embodiment of the present invention, FIG. 4 is a diagram showing the Hamming distance from the adjacent signal point in gray encoding according to the first embodiment of the present invention, and FIG. 5 is a diagram showing comparison of an error rate characteristic according to the first embodiment of the present invention. A description will be given by referring to FIGS. 1 to 5 as to operation of the communication system 3 according to the first embodiment of the present invention.

FIG. 2C shows a correspondence table in the case of encoding input signals (b2, b1, b0) to correlated ternary signals (T1, T0) of two symbols. FIG. 2B shows a correspondence table in the case of encoding input signals (b4, b3) to uncorrelated binary signals B1, B0 of two symbols. FIG. 2A shows a correspondence table in the case of encoding the correlated ternary signals (T1, T0) and uncorrelated binary signals B1, B0 to a senary phase. 0 and 1 as suffixes denote the first and second symbols respectively.

Next, in the correspondence table shown in FIG. 2A, the Hamming distance is 1 between phases 3 and 4 and between phases 6 and 0 because only the binary signal of 1 bit is different. In the correspondence table shown in FIG. 2A, only the ternary signal of 1 bit is different between phases 1 and 2, between phases 2 and 3, between phases 4 and 5 and between phases 5 and 6, where the Hamming distance is encoded to a minimum.

FIG. 3 shows average values of the Hamming distance between the adjacent signal points in the case of applying the encoding according to the first embodiment of the present invention. It is the Hamming distance of an error of a binary signal or so in the case where an error of ±1 occurs to each of senary signals h1, h0. The average value of the Hamming distance is 19/16.

FIG. 4 shows average values of the Hamming distance between the adjacent signal points in the case of applying the gray encoding. It is the Hamming distance of an error of a binary signal or so in the case where an error of ±1 occurs in each of senary signals h1, h0. The average value of the Hamming distance is 2.

In another example of the first embodiment of the present invention, its basic configuration is as above as described as to the case of b=5, m=2 in the six-phase phase modulation. Another configuration is also possible as to a data conversion portion for converting the binary signal of length b to the senary signal of length m. For instance, the technique of the embodiment of the present invention is also applicable to the cases of (18, 7), (23, 9) and (31, 12) as combinations of (b, m) for the sake of minimizing the error rate.

The bit error rate of N-phase phase modulation is generally represented by the following formulas.

$$P = \frac{\beta}{\eta} erfc\left(\sin(\pi/N)\sqrt{\eta\gamma}\right) \quad (1)$$

$$erfc(x) = \frac{2}{\sqrt{\pi}} \int_x^\infty e^{-t^2} dt \quad (2)$$

Here, $\beta$ is a bit error coefficient and is also an average Hamming distance from the adjacent signal point. The bit error coefficient $\beta$ has different values depending on the encoding of the binary signals. $\eta$ is a transmission efficiency, which is b/m when transmitting a b bit with an m symbol. $\gamma$ is a signal energy per bit versus noise power density ratio (Eb·No) per bit. N is the number of phases, which is N=6 according to the embodiment of the present invention. erfc (x) is a complementary error function.

In the case of applying the gray encoding in the six-phase phase modulation, it is $\beta$=2. In the case of applying the encoding according to the first embodiment of the present invention, it is $\beta$=19/16. Therefore, it is possible to reduce the number of bit errors by approximately 40 percent in the case of applying the encoding according to the first embodiment of the present invention. To be more specific, it is possible to minimize a bit error rate characteristic according to the embodiment of the present invention.

FIG. 5 shows comparison of the error rate characteristic in the case of applying the encoding according to the first embodiment of the present invention to that in the case of applying the gray encoding. The encoding according to the first embodiment of the present invention is BER=$10^{-3}$ and is superior in required Eb/No by approximately 0.4 dB.

As for the first embodiment of the present invention, it is possible, compared to the case of converting a binary signal of 5 bits to a senary signal of two symbols, to implement it by converting a binary signal of 3 bits out of 5 bits to a ternary signal of two symbols and just changing a connection as to a binary signal of 2 bits out of 5 bits. Thus, the circuitry can be simplified.

EXAMPLE

Next, the example of the present invention will be described by referring to the drawings. The modulation and demodulation system (communication system) according to an example of the present invention has the same configuration as well as operation as the communication system 3 according to the above-mentioned embodiment of the present invention shown in FIG. 1.

Figure 6:
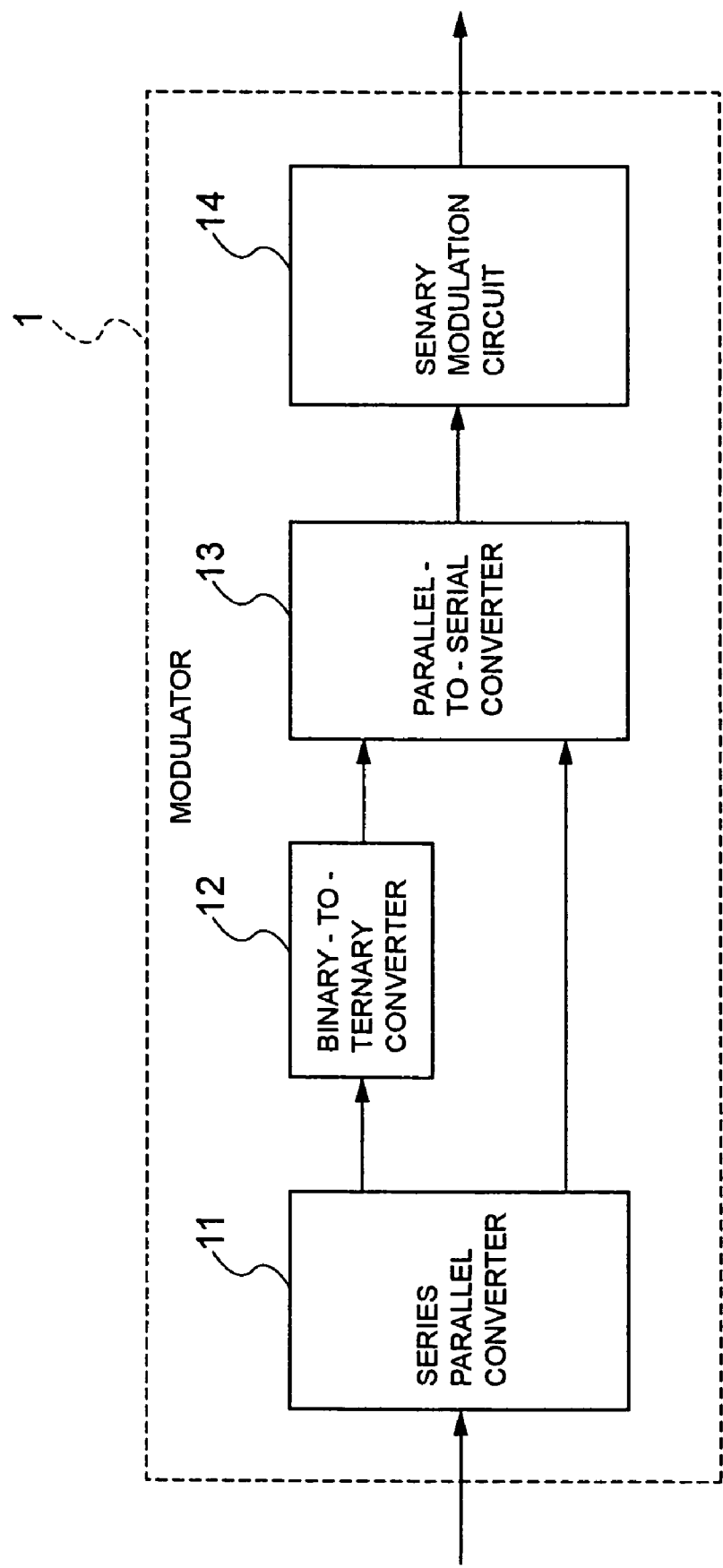
FIG. 6 is a block diagram showing a configuration of a modulator according to an example of the present invention.

FIG. 6 is a block diagram showing a configuration of a modulator according to an example of the present invention.

In FIG. 6, the modulator 1 according to an example of the present invention is configured by a series parallel converter 11, a binary-to-ternary converter 12, a parallel-to-serial converter (multiplexer) 13 and a senary modulation circuit 14.

The series parallel converter 11 inputs serial binary signal data of b bits and outputs parallel binary signal data of (b−m) bits and m bits. The binary-to-ternary converter 12 converts the parallel binary signal data of (b−m) bits to a ternary signal.

The parallel-to-serial converter 13 combines the m-bit binary signal data outputted from the series parallel converter 11 with the m-digit ternary signal data outputted from the binary-to-ternary converter 12 to convert them to one piece of serial signal. The senary modulation circuit 14 modulates the senary signals sequentially outputted from the parallel-to-serial converter 13 to senary phase signals.

In this case, the parallel-to-serial converter 13 receives ternary signals of length m ($t_{m-1}, t_{m-2}, \ldots, t_1, t_0$) outputted from the binary-to-ternary converter 12 and binary signals of length m ($b_{m-}, b_{m-2}, \ldots, b_1, b_0$) outputted from the series parallel converter 11 to output them as senary signals ($b_i, t_i$) (i=0, 1, ..., m−1).

The senary modulator 14 assigns (0, 0), (0, 1), (0, 2), (1, 2), (1, 1) and (1, 0) which are the senary signals ($b_i, t_i$) to the first to sixth phases respectively.

In this case, it is considered that errors predominantly occur at the adjacent signal points under a thermal noise environment. As either the binary signal or the ternary signal is erroneous at the adjacent signal point and the error in the ternary signal is minimized, a mean error rate of the binary signal is minimized corresponding to all the errors of the transmitted senary signals.

Figure 7:
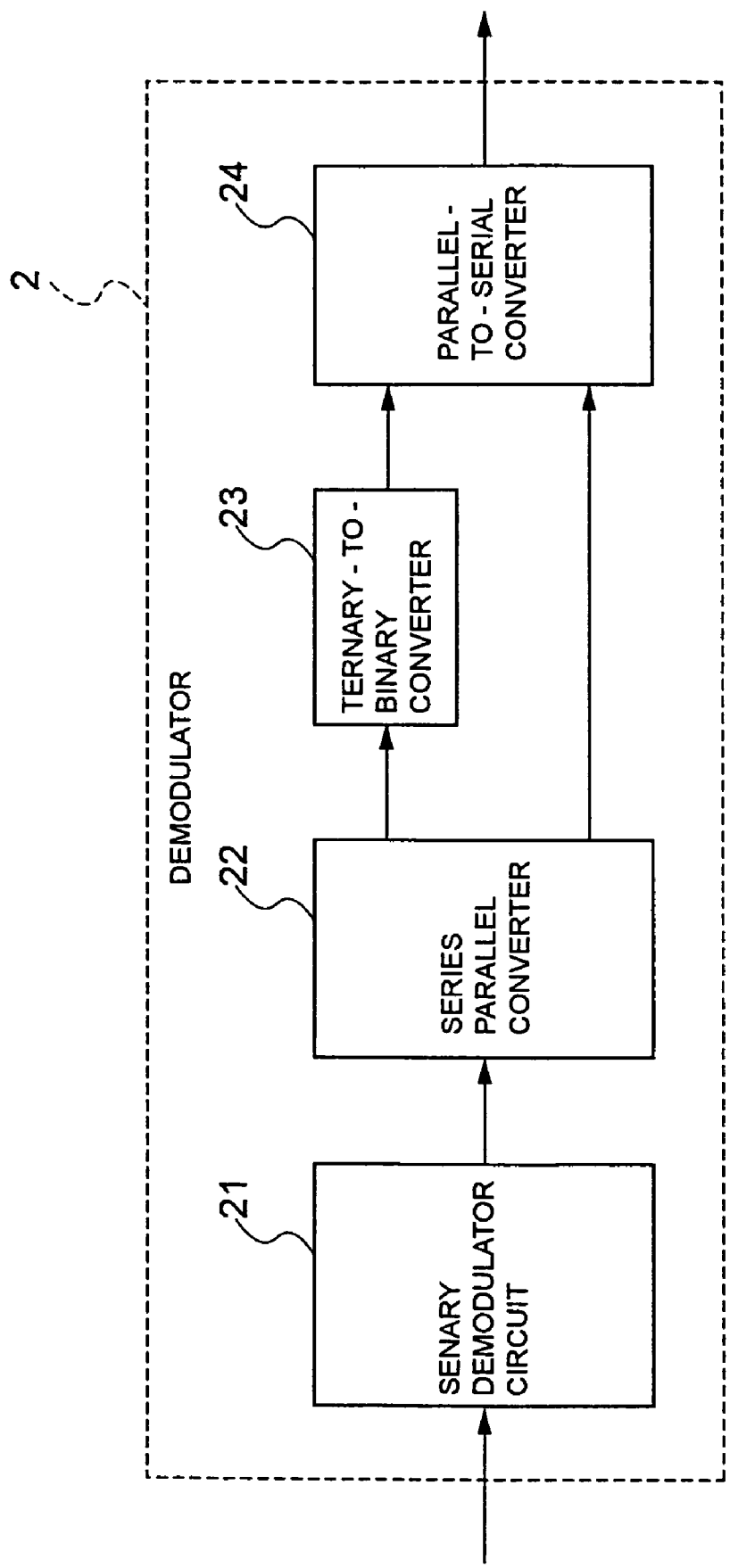
FIG. 7 is a block diagram showing a configuration of a demodulator according to an example of the present invention.

FIG. 7 is a block diagram showing a configuration of the demodulator according to an example of the present invention. In FIG. 7, the demodulator 2 according to an embodiment of the present invention is configured by a senary demodulator circuit 21, series parallel converter (separator circuit) 22, a ternary-to-binary converter 23 and a parallel-to-serial converter 24.

The senary demodulator circuit 21 demodulates the senary phase signals, and the series parallel converter 22 converts the one piece of serial signal inputted from the senary demodulator circuit 21 to a combination of the binary signal data of m bits and the m-digit ternary signal data. The ternary-to-binary converter 23 converts the m-digit ternary signal to the binary signal of (b−m) bits.

The parallel-to-serial converter 24 inputs the binary signal data of parallel (b−m) bits outputted from the ternary-to-binary converter 23 and parallel m bits outputted from the series parallel converter 22, and outputs serial binary signal data of m bits.

In this case, the senary demodulator circuit 21 assigns the first to sixth phases as the senary signals ($b_i, t_i$) to (0, 0), (0, 1), (0, 2), (1, 2), (1, 1) and (1, 0) respectively.

The series parallel converter 22 inputs the senary signals ($b_i, t_i$) (i=0, 1, ..., m−1), and outputs the ternary signals of length m ($t_{m-1}, t_{m-2}, \ldots, t_1, t_0$) and binary signals of length m ($b_{m-1}, b_{m-2}, \ldots, b_1, b_0$).

In this case, it is considered that errors predominantly occur at the adjacent signal points under a thermal noise environment. As either the binary signal or the ternary signal is erroneous at the adjacent signal point and the error in the ternary signal is minimized, the mean error rate of the binary signal is minimized corresponding to all the errors of the transmitted senary signal.

Figure 8:
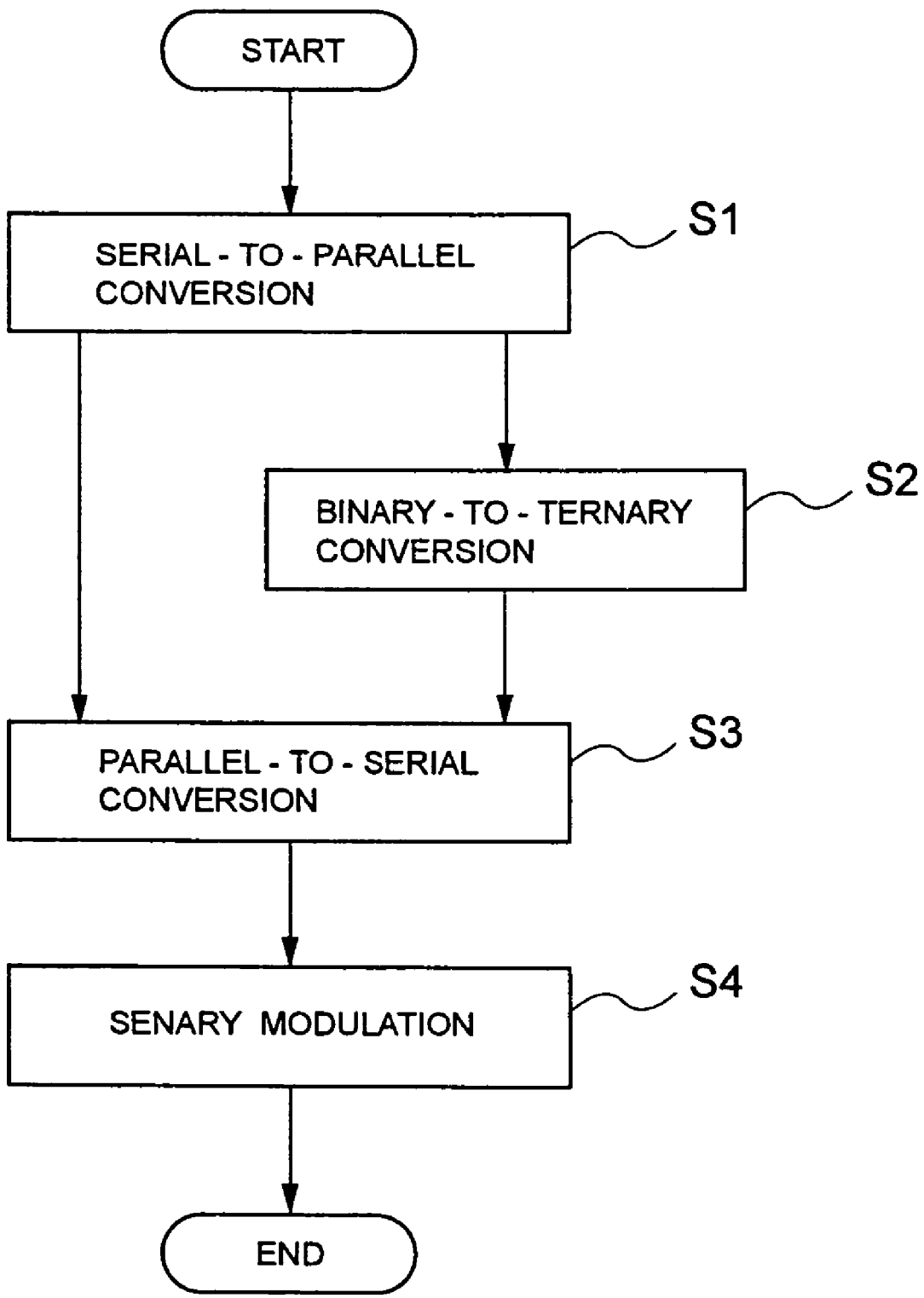
FIG. 8 is a flowchart showing operation of the modulator according to an example of the present invention.

FIG. 8 is a flowchart showing the operation of the modulator 1 according to an example of the present invention. A description will be given by referring to FIGS. 1, 6 and 8 as to the operation of the modulator 1 according to an example of the present invention.

The modulator 1 performs a serial-to-parallel conversion process for inputting the serial binary signal data of b bits and outputting the parallel binary signal data of (b−m) bits and m bits in the series parallel converter 11 (step S1 in FIG. 8). Subsequently, the modulator 1 performs a binary-to-ternary conversion process for converting the parallel binary signal data of (b−m) bits to a ternary signal in the binary-to-ternary converter 12 (step S2 in FIG. 8).

Next, the modulator 1 performs in the parallel-to-serial converter 13 a parallel-to-serial conversion process for combining the binary signal data of m bits outputted from the serial-to-parallel conversion process of the step S1 and the m-digit ternary signal data outputted from the binary-to-ternary conversion process of the step S2 to convert them to one piece of serial signal (step S3 in FIG. 8).

Lastly, the modulator 1 performs a senary modulation process for converting the senary signals sequentially outputted from the parallel-to-serial conversion process of the step S3 to the senary phase signals in the senary modulation circuit 14 (step S4 in FIG. 8).

In this case, the parallel-to-serial conversion process of the step S3 receives the ternary signals of length m ($t_{m-1}$, $t_{m-2}$, ..., $t_1$, $t_0$) outputted from the binary-to-ternary conversion process of the step S2 and binary signals of length m ($b_{m-}$, $b_{m-2}$, ..., $b_1$, $b_0$) outputted from the serial-to-parallel conversion process of the step S1 to output them as senary signals ($b_i$, $t_i$) (i=0, 1, ..., m−1).

The senary modulation process of the step S4 assigns (0, 0), (0, 1), (0, 2), (1, 2), (1, 1) and (1, 0) which are the senary signals ($b_i$, $t_i$) to the first to sixth phases respectively.

In this case, it is considered that errors predominantly occur at the adjacent signal points under the thermal noise environment. As either the binary signal or the ternary signal is erroneous at the adjacent signal point and the error in the ternary signal is minimized, the mean error rate of the binary signal is minimized corresponding to all the errors of the transmitted senary signal.

Figure 9:
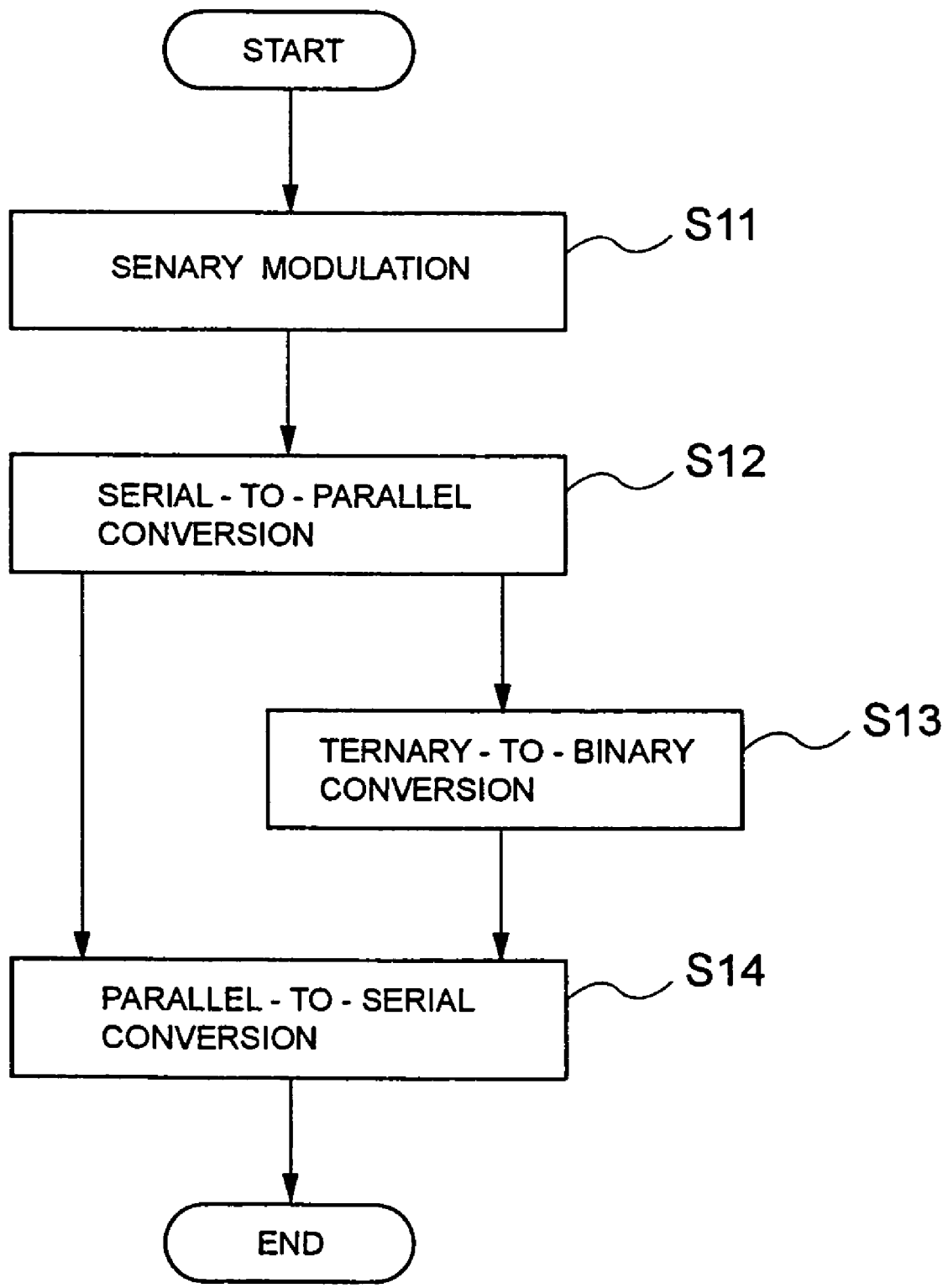
FIG. 9 is a flowchart showing the operation of the demodulator according to an example of the present invention.

FIG. 9 is a flowchart showing the operation of the demodulator 2 according to an example of the present invention. A description will be given by referring to FIGS. 1, 7 and 9 as to the operation of the demodulator 2 according to an embodiment of the present invention.

The demodulator 2 performs a senary demodulation process for demodulating the senary phase signal in the senary demodulator circuit 21 (step S11 in FIG. 9), and performs the serial-to-parallel conversion process for converting one piece of serial signal inputted from the senary demodulation process of the step S11 to a combination of the binary signal data of m bits and the m-digit ternary signal data in the series parallel converter 22 (step S12 in FIG. 9).

Subsequently, the demodulator 2 performs a ternary-to-binary conversion process for converting them-digit ternary signal to the binary signal of (b−m) bits in the ternary-to-binary converter 23 (step S13 in FIG. 9), and performs in the parallel-to-serial converter 24 the parallel-to-serial conversion process for inputting the binary signal data of the parallel (b−m) bits outputted from the ternary-to-binary conversion process of the step S12 and the binary signal data of parallel m bits outputted from the serial-to-parallel conversion process of the step S11 and outputting the serial binary signal data of m bits (step S14 in FIG. 9).

In this case, the senary demodulation process of the step S11 assigns the first to sixth phases as the senary signals ($b_i$, $t_1$) to (0, 0), (0, 1), (0, 2), (1, 2), (1, 1) and (1, 0) respectively.

The serial-to-parallel conversion process of the step S12 inputs the senary signals ($b_i$, $t_i$) (i=0, 1, ..., m−1) and outputs the ternary signals of length m ($t_{m-1}$, $t_{m-2}$, ..., $t_1$, $t_0$) and binary signals of length m ($b_{m-1}$, $b_{m-2}$, ..., $b_1$, $b_0$).

In this case, it is considered that errors predominantly occur at the adjacent signal points under the thermal noise environment. As either the binary signal or the ternary signal is erroneous at the adjacent signal point and the error in the ternary signal is minimized, the mean error rate of the binary signal is minimized per all the errors of the transmitted senary signal.

It is thereby possible, according to this example, to have the effect of minimizing the bit error rate and simplifying the circuit configuration in the six-phase phase modulation method.

Next, a second embodiment of the present invention will be described by referring to the drawings. The modulation and demodulation system (communication system) according to the second embodiment of the present invention has the same configuration as the first embodiment (FIG. 1). In FIG. 1, the communication system 3 according to this embodiment is configured by the transmitter 10 having the modulator 1 mounted thereon and receiver 20 having the demodulator 2 mounted thereon.

The senary signal phase-modulated and outputted by the modulator 1 is received and phase-modulated by the demodulator 2 at the destination to the binary signal before conversion by the modulator 1. As described above, this process of the modulator 1 assigns (0, 0), (0, 1), (0, 2), (1, 2), (1, 1) and (1, 0) to first to sixth phases respectively by having the senary signals expressed as (Bi, Ti) with i=1 as a first symbol, i=2 as a second symbol, the binary signal as Bi and ternary signal as Ti.

The conversion of the senary signal to the binary signal by the demodulator 2 can be implemented as with the modulator 1 of the second embodiment of the present invention. For instance, it is possible to store transmitted senary signals and sequentially convert every senary signal of length 2 to the binary signal of length 5 so as to output them. This process of the demodulator 2 assigns the first to sixth phases as the senary signals (Bi, Ti) to (0, 0), (0, 1), (0, 2), (1, 2), (1, 1) and (1, 0) respectively.

Figures 12A, 12B:
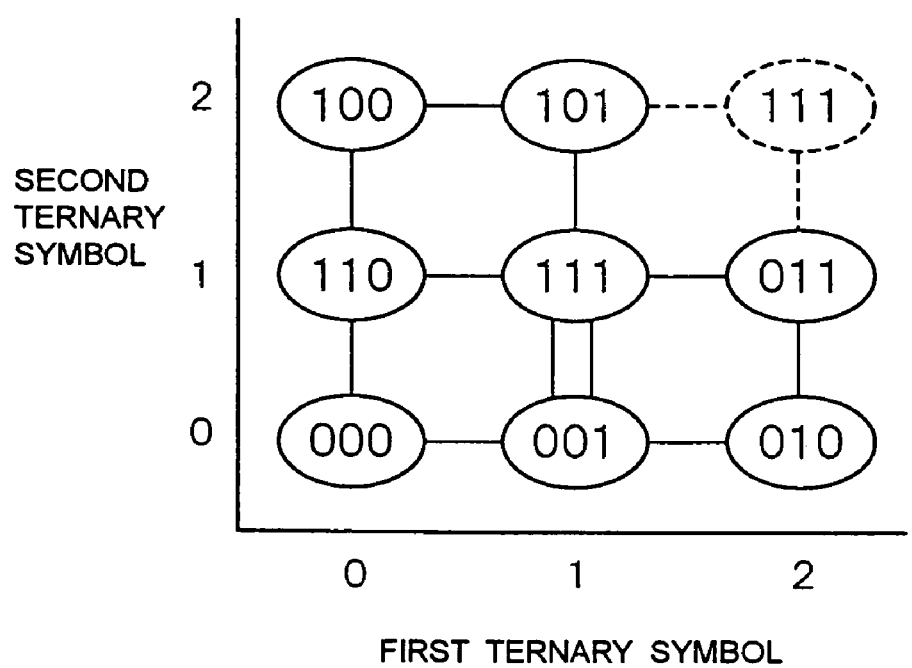
FIGS. 12A and 12B are diagrams showing the Hamming distance from the adjacent signal point in a related technique
Figures 13A, 13B:
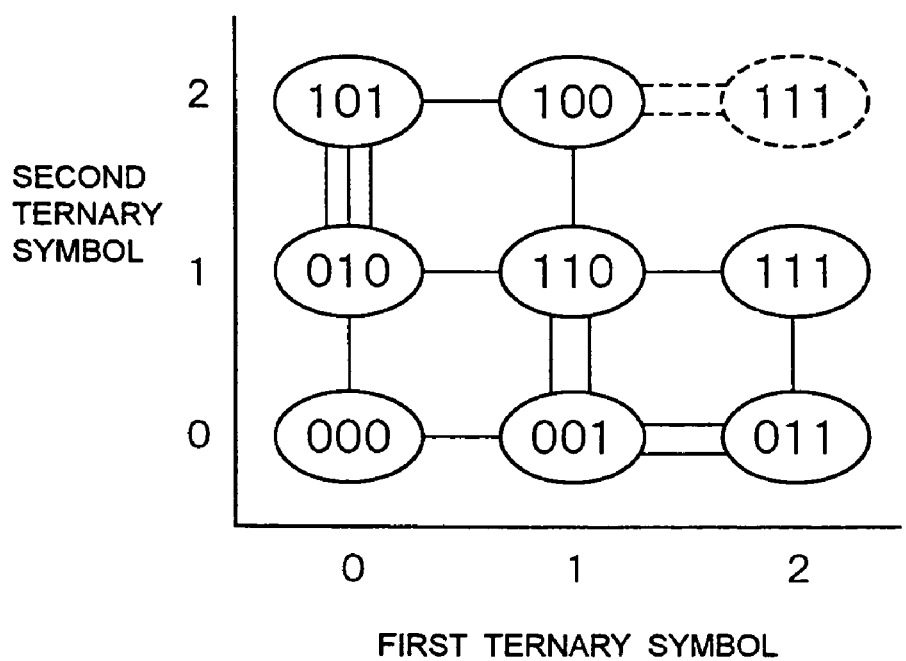
FIGS. 13A and 13B are diagrams showing the Hamming distance from the adjacent signal point in the gray encoding according to the second embodiment of the present invention.
Figure 14:
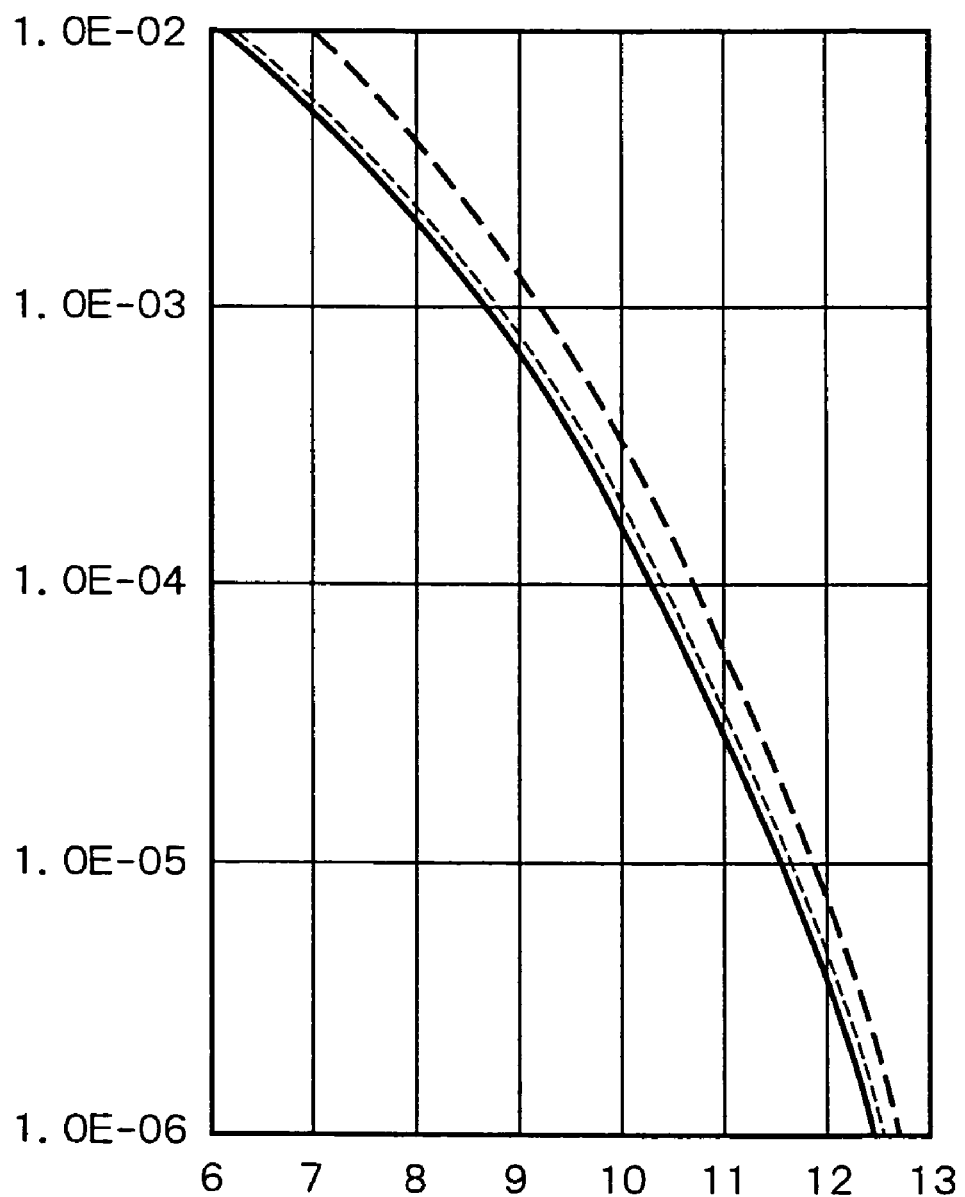
FIG. 14 is a diagram showing comparison of the error rate characteristic according to the second embodiment of the present invention.

FIGS. 10A to 10C are diagrams showing the encoding process according to the second embodiment of the present invention, FIGS. 11A to 11D are diagrams showing the Hamming distance from the adjacent signal point in the encoding according to the second embodiment of the present invention, FIGS. 12A and 12B are diagrams showing the Hamming distance from the adjacent signal point in the encoding by a related technique, FIGS. 13A and 13B are diagrams showing the Hamming distance from the adjacent signal point in the gray encoding, and FIG. 14 is a diagram showing comparison of the error rate characteristic according to the second embodiment of the present invention. A description will be given by referring to FIGS. 1 and 10 to 14 as to the operation of the communication system 3 according to the second embodiment of the present invention.

FIG. 10C shows a correspondence table in the case of encoding the input signals (b2, b1, b0) to the correlated ternary signals of two symbols (T1, T2). When the ternary signals of two symbols (T1, T2) are annularly arranged, the Lee distance is 1 among all the adjacent signal points. To be more specific, it is (0, 0)-(0, 1)-(0, 2)-(1, 2)-(2, 2)-(2, 1)-(2, 0)-(2, 1)(-(0, 0)). The binary 3-bit signals (b2, b1, b0) corresponding to the ternary signals of two symbols are (0, 0, 0)-(0, 0, 1)-(0, 1, 1)-(0, 1, 0)-(1, 1, 0)-(1, 1, 1)-(1, 0, 1) and (1, 0, 0) (-(0, 0, 0)).

Therefore, according to the encoding process of the second embodiment of the present invention, the ternary signals of length "2" are annularly arranged to be an error of the Lee distance 1 in every adjacent combination, and the binary signals of length "3" are associated with the ternary signals of length "2" so as to render the Hamming distance between the binary signals of length 3 as 1.

FIG. 10B shows a correspondence table in the case of encoding the input signals (b4, b3) to uncorrelated binary signals of two symbols B1, B2. FIG. 10A shows a correspondence table in the case of encoding correlated ternary signals (T1, T2) and uncorrelated binary signals (B1, B0) to a senary phase. Suffixes 1 and 2 denote the first symbol and second symbol respectively.

Next, according to the correspondence table shown in FIG. 10A, the Hamming distance is 1 between phases 3 and 4 and between phases 6 and 0 because only the binary signal of 1 bit of Bi is different. According to the correspondence table shown in FIG. 10A, the Hamming distance is encoded to a minimum between phases 1 and 2, between phases 2 and 3, between phases 4 and 5 and between phases 5 and 6 respectively because only one piece of the ternary signal of Ti is different.

FIGS. 11A to 11D show the Hamming distance between the adjacent signal points in the case of applying the encoding according to the second embodiment of the present invention. When an error of ±1 occurs to each of the senary signals, an error of the Hamming distance 1 occurs to the binary signal Bi. The ternary signal Ti has errors of the Lee distance 1 occurring thereto, such as 0→1, 0→1, 1→2 and 2→1 and no error such as 0→2 and 2→0 occurs.

As for the encoding shown in FIG. 11A, there are three cases of the second symbol being 0, 1 and 2 when the first symbol errs from 0 to 1, where the Hamming distances from error symbols are 1, 2 and 1 respectively. When the second symbol errs from 0 to 1, there are three cases of the first symbol being 0, 1 and 2, where the Hamming distances from the error symbols are 1, 2 and 1 respectively. Thus, the average Hamming distance is 4/3 when the ternary signal errs from 0 to 1. Similarly, the average Hamming distances are 1, 1 and 1 when the ternary signal errs, such as 1→0, 1→2 and 2→1 respectively.

Therefore, when the senary phase errs as 0→1, 1→2, 2→3, 3→4, 4→5 and 5→0, the errors occur as the ternary signal 0→1, ternary signal 1→2, binary signal 0→1, ternary signal 2→1, ternary signal 1→0 and binary signal 1→2. Considering that a probability of the senary signals 0, 2, 3 and 5 is 6/32 and a probability of the senary signals 1 and 4 is 4/32, the average Hamming distance of the entire senary signals is $(4/3+1+1) \cdot 6/32 + (1+1) \cdot 4/32 = 17/16$. In FIGS. 11A to 11D, the binary signal of the ternary signal (2, 2) not transmitted is (1, 1, 1). However, the average Hamming distance is also 17/16 in other cases.

Referring to FIGS. 11A to 11D, in the case of applying the encoding according to the second embodiment of the present invention, an average of the Hamming distances between the adjacent signal points is 17/16 when an error of ±1 occurs to each of the senary signals.

FIGS. 12A and 12B show the average of the Hamming distances between the adjacent signal points in the case of applying the encoding according to the embodiment of the related technique. In the case where an error of ±1 occurs to each of the senary signals, the average of the Hamming distance is 19/16 before and after an error of a binary signal.

FIGS. 13A and 13B show the average of the Hamming distances between the adjacent signal points in the case of applying the encoding according to the second embodiment of the present invention. It is the Hamming distance before and after an error of a binary signal in the case where an error of ±1 occurs to each of senary signals h1, h0. The average of the Hamming distance is 19/16.

FIGS. 13A and 13B show the average of the Hamming distances between the adjacent signal points in the case of applying the gray encoding. The average value of the Hamming distances is 2 before and after an error of a binary signal in the case where an error of ±1 occurs to each of the senary signals.

In general, a bit error rate P of N-phase phase modulation can be expressed by the aforementioned formulas (1) and (2). Here, β denotes the sum of the average Hamming distances with the adjacent signal points. This coefficient β has a different value depending on the encoding of the binary signals. η is a transmission efficiency, which is 5/2 when transmitting 5 bits with two symbols. γ is a signal energy versus noise power density ratio (Eb/No) per bit. N is the number of phases, which is N=6 according to the embodiment of the present invention. erfc (x) is an error complementary function.

In the case of applying the gray encoding in the six-phase phase modulation, it is β=2. In the case of applying the encoding of the related technique, it is β=19/16. In the case of applying the encoding according to the second embodiment of the present invention, it is β=17/16. Therefore, in the case of applying the encoding according to the second embodiment of the present invention, it is possible to reduce the number of bit errors by approximately 7 percent as to the gray encoding and by approximately 10 percent as to the encoding of the related technique. To be more specific, it is possible to minimize a bit error rate characteristic according to the second embodiment of the present invention.

FIG. 14 shows comparison of the error rate characteristic in the case of applying the encoding according to the second embodiment of the present invention to that in the case of applying the gray encoding. The encoding according to the second embodiment of the present invention is BER=$10^{-3}$ points and is superior in required Eb/No by approximately 0.4 dB.

As for the second embodiment of the present invention, it is possible, compared to the case of converting a binary signal of 5 bits to a senary signal of two symbols, to implement it by converting a binary signal of 3 bits out of 5 bits to a ternary signal of two symbols and just changing a connection as to a binary signal of 2 bits out of 5 bits. Thus, the circuitry can be simplified.

Example

Next, the embodiment of the present invention will be described by referring to the drawings. The modulation and demodulation system (communication system) according to an embodiment of the present invention has the same configuration as well as operation as the communication system 3 according to the above-mentioned second embodiment of the present invention shown in FIG. 1.

The configuration of the modulator according to an embodiment of the present invention is the same as that of the first embodiment (FIG. 6). In FIG. 6, the modulator 1 is configured by the series parallel converter 11, binary-to-ternary converter 12, a parallel-to-serial converter (multiplexer) 13 and a senary modulation circuit 14.

The series parallel converter 11 inputs serial binary signal data of 5 bits and outputs parallel binary signal data of 3 bits and 2 bits. The binary-to-ternary converter 12 converts the parallel binary signal data of 3 bits to a ternary signal. The parallel-to-serial converter 13 combines the 2-bit binary signal data outputted from the series parallel converter 11 with the 2-digit ternary signal data outputted from the binary-to-ternary converter 12 to convert them to one piece of serial signal. The senary modulation circuit 14 modulates the senary signals sequentially outputted from the parallel-to-serial converter 13 to senary phase signals.

In this case, the parallel-to-serial converter 13 receives ternary signals of length "2" (T1, T2) outputted from the binary-to-ternary converter 12 and binary signals of length 2 (B1, B2) outputted from the series parallel converter 11 to output them as senary signals ($B_i$, $T_i$) (i=1, 2).

The senary modulator 14 assigns (0, 0), (0, 1), (0, 2), (1, 2), (1, 1) and (1, 0) which are the senary signals (Bi, Ti) to the first to sixth phases respectively. Here, i=1 is a first symbol, and i=2 is a second symbol.

In this case, it is considered that errors predominantly occur at the adjacent signal points under the thermal noise environment. As either the binary signal or the ternary signal is erroneous at the adjacent signal point and the error in the ternary signal is minimized, the mean error rate of the binary signal is minimized per all the errors of the transmitted senary signal.

The configuration of the demodulator according to an example of the present invention is the same as that of the first embodiment (FIG. 7). In FIG. 7, the demodulator 2 is configured by the senary demodulator circuit 21, series parallel converter (separator circuit) 22, ternary-to-binary converter 23 and parallel-to-serial converter 24.

The senary demodulator circuit 21 demodulates the senary phase signals, and the series parallel converter 22 converts the one piece of serial signal inputted from the senary demodulator circuit 21 to a combination of the binary signal data of 2 bits and the 2-digit ternary signal data. The ternary-to-binary converter 23 converts the 2-digit ternary signal to the binary signal of 3 bits. The parallel-to-serial converter 24 inputs the binary signal data of parallel 3 bits outputted from the ternary-to-binary converter 23 and parallel 2 bits outputted from the series parallel converter 22, and outputs the serial binary signal data of 5 bits.

In this case, the senary demodulator circuit 21 assigns the first to sixth phases as the senary signals (Bi, Ti) to (0, 0), (0, 1), (0, 2), (1, 2), (1, 1) and (1, 0) respectively. Here, i=1 is the first symbol, and i=2 is the second symbol.

The series parallel converter 22 inputs the senary signals (Bi, Ti) (i=1, 2) and outputs the ternary signals of length "2" (T1, T2) and binary signals of length "2" (B1, B2). In this case, it is considered that errors predominantly occur at the adjacent signal points under the thermal noise environment. As either the binary signal or the ternary signal is erroneous at the adjacent signal point and the error in the ternary signal is minimized, the mean error rate of the binary signal is minimized corresponding to all the errors of the transmitted senary signal.

The operation of the modulator 1 according to an example of the present invention is the same as that of the first embodiment (FIG. 8). A description will be given by referring to FIGS. 1, 6 and 8 as to the operation of the modulator 1 according to an example of the present invention.

The modulator 1 performs the serial-to-parallel conversion process for inputting the serial binary signal data of 5 bits and outputting the parallel binary signal data of 3 bits and 2 bits in the series parallel converter 11 (step S1 in FIG. 8). Subsequently, the modulator 1 performs a binary-to-ternary conversion process for converting the parallel binary signal data of 3 bits to a ternary signal in the binary-to-ternary converter 12 (step S2 in FIG. 8).

Next, the modulator 1 performs in the parallel-to-serial converter 13 the parallel-to-serial conversion process for combining the binary signal data of 2 bits outputted from the serial-to-parallel conversion process of the step S1 and the 2-digit ternary signal data outputted from the binary-to-ternary conversion process of the step S2 to convert them to one piece of serial signal (step S3 in FIG. 8).

Lastly, the modulator 1 performs the senary modulation process for converting the senary signals sequentially outputted from the parallel-to-serial conversion process of the step S3 to the senary phase signals in the senary modulation circuit 14 (step S4 in FIG. 8).

In this case, the parallel-to-serial conversion process of the step S3 receives the ternary signals of length "2" (T1, T2) outputted from the binary-to-ternary conversion process of the step S2 and binary signals of length "2" (B1, B2) outputted from the serial-to-parallel conversion process of the step S1 to output them as senary signals (Bi, Ti) (i=1, 2).

The senary modulation process of the step S4 assigns (0, 0), (0, 1), (0, 2), (1, 2), (1, 1) and (1, 0) which are the senary signals (Bi, Ti) to the first to sixth phases respectively. Here, i=1 is the first symbol, and i=2 is the second symbol.

In this case, it is considered that errors predominantly occur at the adjacent signal points under the thermal noise environment. As either the binary signal or the ternary signal is erroneous at the adjacent signal point and the error in the ternary signal is minimized, the mean error rate of the binary signal is minimized corresponding to all the errors of the transmitted senary signal.

The operation of the demodulator 2 according to an example of the present invention is the same as that of the first embodiment (FIG. 9). A description will be given by referring to FIGS. 1, 7 and 9 as to the operation of the demodulator 2 according to an example of the present invention.

The demodulator 2 performs a senary demodulation process for demodulating the senary phase signal in the senary demodulator circuit 21 (step S11 in FIG. 9), and performs the serial-to-parallel conversion process for converting one piece of serial signal inputted from the senary demodulation process of the step S11 to a combination of the binary signal data of 2 bits and the 2-digit ternary signal data in the series parallel converter 22 (step S12 in FIG. 9).

Subsequently, the demodulator 2 performs a ternary-to-binary conversion process for converting the 2-digit ternary signal to the binary signal of 3 bits in the ternary-to-binary converter 23 (step S13 in FIG. 9), and performs in the parallel-to-serial converter 24 the parallel-to-serial conversion process for inputting the binary signal data of the parallel 3 bits outputted from the ternary-to-binary conversion process of the step S12 and of parallel 2 bits outputted from the serial-to-parallel conversion process of the step S11 and outputting the serial binary signal data of 2 bits (step S14 in FIG. 9).

In this case, the senary demodulation process of the step S11 assigns the first to sixth phases as the senary signals (Bi, Ti) to (0, 0), (0, 1), (0, 2), (1, 2), (1, 1) and (1, 0) respectively. Here, i=1 is the first symbol, and i=2 is the second symbol.

The serial-to-parallel conversion process of the step S12 inputs the senary signals (Bi, Ti) (i=1, 2) and outputs the ternary signals of length 2 (T1, T2) and binary signals of length 2 (B1, B2). In this case, it is considered that errors predominantly occur at the adjacent signal points under the thermal noise environment. As either the binary signal or the ternary signal is erroneous at the adjacent signal point and the error in the ternary signal is minimized, the mean error rate of the binary signal is minimized corresponding to all the errors of the transmitted senary signal.

It is thereby possible, according to this example, to have the effect of minimizing the bit error rate and simplifying the circuit configuration in the six-phase phase modulation method.

What is claimed is:

1. A modulation and demodulation system for having a senary phase shift keying modulation transmitting binary signal and phase shift keying demodulation recovering binary signal, wherein:
the modulator has data conversion means for converting a binary signal of length b to a senary signal of length m;
the data conversion means includes conversion means for converting a binary signal of length b−m to a ternary signal of length m; and
first to sixth phases are expressed as (B, T) by using binary signal B and ternary signal T, which are (0, 0), (0, 1), (0, 2), (1, 2), (1, 1) and (1, 0) respectively, wherein the data conversion means associates the binary signal of length b−m with the ternary signal of length m to reduce a mean error of each bit of the binary signal of length b−m corresponding to all the errors of a Lee distance 1 of the ternary signal of length m so as to convert the binary signal of length b to the senary signal of length m.

2. The modulation and demodulation system according to claim 1, wherein b is an integer and m is an integer approximately equal to and larger than $b/\log_2 6$.

3. The modulation and demodulation system according to claim 1, wherein:
when b=5, m=2 according to the data conversion means,
the data conversion means converts the binary signal of length 3 to the ternary signal of length 2 as a correspondence between the binary signal of length 3 and the ternary signal of length 2 according to a conversion rule for assigning one of the following four sets to a set of the eight ternary signals of length 2 ((0, 0), (0, 1), (0, 2), (1, 0), (1, 1), (1, 2), (2, 0) and (2, 1)) with the eight binary signals of length 3 as a set:
((0, 0, 0), (0, 0, 1), (0, 1, 1), (1, 1, 0), (1, 1, 1), (0, 1, 0), (1, 0, 0) and (1, 0, 1)),
((0, 0, 0), (0, 0, 1), (0, 1, 0), (1, 1, 0), (1, 1, 1), (0, 1, 1), (1, 0, 0) and (1, 0, 1)),
((0, 0, 0), (0, 1, 1), (0, 0, 1), (1, 0, 0), (1, 1, 1), (1, 0, 1), (0, 1, 0) and (1, 1, 0)) and
((0, 0, 0), (0, 1, 1), (0, 0, 1), (1, 0, 0), (1, 1, 1), (1, 0, 1), (1, 1, 0) and (0, 1, 0)).

4. The modulation and demodulation system according to claim 3, wherein, according to the conversion rule, the data conversion means adds the binary signals of length 3 (v2, v1, v0) [(v2, v1, v0) is one of (0, 0, 1), (0, 1, 0), (0, 1, 1), (1, 0, 0), (1, 0, 1), (1, 1, 0) and (1, 1, 1)] to the binary signals of length 3 (b2, b1, b0) respectively to assign each bit as (b2+v2, b1+v1, b0+v0) (symbol of operation + is an exclusive OR) to the ternary signals of length 2 ((0, 0), (0, 1), (0, 2), (1, 0), (1, 1), (1, 2), (2, 0) and (2, 1) so as to convert the binary signals of length 3 to the ternary signals of length 2.

5. The modulation and demodulation system according to claim 3, wherein, according to the conversion rule, each bit of the binary signals (b2, b1, b0) is replaced to assign each bit as (b2, b0, b1), (b1, b0, b2), (b1, b2, b0), (b0, b0, b2) and (b0, b2, b1) to the thirty-two sets converted from the binary signals of length 3 to the ternary signals of length 2 so as to convert the binary signals of length 3 to the ternary signals of length 2.

6. A modulator for phase-modulating a binary signal to a senary signal and outputting it, comprising:
data conversion means for converting a binary signal of length b to a senary signal of length m, wherein:
the data conversion means includes conversion means for converting a binary signal of length b−m to a ternary signal of length m; and
first to sixth phases are expressed as (B, T) by using binary signal B and ternary signal T, and are (0, 0), (0, 1), (0, 2), (1, 2), (1, 1) and (1, 0) respectively, wherein the data conversion means associates the binary signal of length b−m with the ternary signal of length m to reduce a mean error rate of each bit of the binary signal of length b−m corresponding to all the errors of Lee distance 1 of the ternary signal of length m so as to convert the binary signal of length b to the senary signal of length m.

7. The modulator according to claim 6, wherein b is an integer and m is an integer approximately equal to and larger than $b/\log_2 6$.

8. The modulator according to claim 6, wherein:
when b=5, m=2 according to the data conversion means,
the data conversion means converts the binary signal of length 3 to the ternary signal of length 2 as a correspondence between the binary signal of length 3 and the ternary signal of length 2 according to a conversion rule for assigning one of the following four sets to a set of the eight ternary signals of length 2 ((0, 0), (0, 1), (0, 2), (1, 0), (1, 1), (1, 2), (2, 0) and (2, 1)) with the eight binary signals of length 3 as a set:
((0, 0, 0), (0, 0, 1), (0, 1, 1), (1, 1, 0), (1, 1, 1), (0, 1, 0), (1, 0, 0) and (1, 0, 1)),
((0, 0, 0), (0, 0, 1), (0, 1, 0), (1, 1, 0), (1, 1, 1), (0, 1, 1), (1, 0, 0) and (1, 0, 1)),
((0, 0, 0), (0, 1, 1), (0, 0, 1), (1, 0, 0), (1, 1, 1), (1, 0, 1), (0, 1, 0) and (1, 1, 0)) and
((0, 0, 0), (0, 1, 1), (0, 0, 1), (1, 0, 0), (1, 1, 1), (1, 0, 1), (1, 1, 0) and (0, 1, 0)).

9. The modulator according to claim 8, wherein, according to the conversion rule, the data conversion means adds the binary signals of length 3 (v2, v1, v0) [(v2, v1, v0) is one of (0, 0, 1), (0, 1, 0), (0, 1, 1), (1, 0, 0), (1, 0, 1), (1, 1, 0) and (1, 1, 1)] to the binary signals of length 3 (b2, b1, b0) respectively to assign each bit as (b2+v2, b1+v1, b0+v0) (symbol of operation + is an exclusive OR) to the ternary signals of length 2 ((0, 0), (0, 1), (0, 2), (1, 0), (1, 1), (1, 2), (2, 0) and (2, 1) so as to convert the binary signals of length 3 to the ternary signals of length 2.

10. The modulator according to claim 9, wherein, according to the conversion rule, each bit of the binary signals (b2, b1, b0) is replaced to assign each bit as (b2, b0, b1), (b1, b0, b2), (b1, b2, b0), (b0, b0, b2) and (b0, b2, b1) to the thirty-two sets converted from the binary signals of length 3 to the ternary signals of length 2 so as to convert the binary signals of length 3 to the ternary signals of length 2.

11. A phase modulation method used for a modulation and demodulation system having a senary phase shift keying modulation transmitting binary signal and phase shift keying demodulation recovering binary signal, comprising:
implementing a data conversion process for converting a binary signal of length b to a senary signal of length m; by using a modulator; wherein
the data conversion process includes a conversion process for converting a binary signal of length b−m to a ternary signal of length m; and
first to sixth phases are expressed as (B, T) by using binary signal B and ternary signal T, which are (0, 0), (0, 1), (0, 2), (1, 2), (1, 1) and (1, 0) respectively, wherein the data conversion process associates the binary signal of length b−m with the ternary signal of length m to reduce a mean error of each bit of the binary signal of length b−m corresponding to all the errors of a Lee distance 1 of the ternary signal of length m so as to convert the binary signal of length b to the senary signal of length m.

12. The phase modulation method according to claim 11, wherein b is an integer and m is an integer approximately equal to and larger than $b/\log_2 6$.

13. The phase modulation method according to claim 11, wherein:
when b=5, m=2 according to the data conversion process, the data conversion process converts the binary signal of length 3 to the ternary signal of length 2 as a correspondence between the binary signal of length 3 and the ternary signal of length 2 according to a conversion rule for assigning one of the following four sets to a set of the eight ternary signals of length 2 ((0, 0), (0, 1), (0, 2), (1, 0), (1, 1), (1, 2), (2, 0) and (2, 1)) with the eight binary signals of length 3 as a set:
((0, 0, 0), (0, 0, 1), (0, 1, 1), (1, 1, 0), (1, 1, 1), (0, 1, 0), (1, 0, 0) and (1, 0, 1)),
((0, 0, 0), (0, 0, 1), (0, 1, 0), (1, 1, 0), (1, 1, 1), (0, 1, 1), (1, 0, 0) and (1, 0, 1)),
((0, 0, 0), (0, 1, 1), (0, 0, 1), (1, 0, 0), (1, 1, 1), (1, 0, 1), (0, 1, 0) and (1, 1, 0)) and
((0, 0, 0), (0, 1, 1), (0, 0, 1), (1, 0, 0), (1, 1, 1), (1, 0, 1), (1, 1, 0) and (0, 1, 0)).

14. The phase modulation method according to claim 13, wherein, according to the conversion rule, the data conversion process adds the binary signals of length 3 (v2, v1, v0) [(v2, v1, v0) is one of (0, 0, 1), (0, 1, 0), (0, 1, 1), (1, 0, 0), (1, 0, 1), (1, 1, 0) and (1, 1, 1)] to the binary signals of length 3 (b2, b1, b0) respectively to assign each bit as (b2+v2, b1+v1, b0+v0) (symbol of operation + is an exclusive OR) to the ternary signals of length 2 ((0, 0), (0, 1), (0, 2), (1, 0), (1, 1), (1, 2), (2, 0) and (2, 1)) so as to convert the binary signals of length 3 to the ternary signals of length 2.

15. The phase modulation method according to claim 14, wherein, according to the conversion rule, each bit of the binary signals (b2, b1, b0) is replaced to assign each bit as (b2, b0, b1), (b1, b0, b2), (b1, b2, b0), (b0, b0, b2) and (b0, b2, b1) to the thirty-two sets converted from the binary signals of length 3 to the ternary signals of length 2 so as to convert the binary signals of length 3 to the ternary signals of length 2.

16. A phase modulation method for, with b as an integer and m as an integer approximately equal to and larger than $b/\log_2 6$, converting a binary signal of length b to a senary signal of length m and transmitting a binary signal correspondingly to a senary phase signal, comprising:
a data conversion process for converting the binary signal of length b to the senary signal of length m, wherein the data conversion process includes a conversion process for converting a binary signal of length b−m to a ternary signal of length m; and
first to sixth phases are expressed as (B, T) by using binary signal B and ternary signal T, which are (0, 0), (0, 1), (0, 2), (1, 2), (1, 1) and (1, 0) respectively, wherein, in the process for converting a binary signal of length b−m to a ternary signal of length m, the binary signal of length b−m is associated with the ternary signal of length m to reduce a mean error rate of each bit of the binary signal of length b−m corresponding to all the errors of a Lee distance 1 of the ternary signal of length m so as to convert the binary signal of length b to the senary signal of length m.

17. The phase modulation method according to claim 16, wherein:
when b=5, m=2 in the process for converting the binary signal of length b−m to the ternary signal of length m, the data conversion process for converting the binary signal of length 3 to the ternary signal of length 2 converts the binary signal of length 3 to the ternary signal of length 2 as a correspondence between the binary signal of length 3 and the ternary signal of length 2 according to a conversion rule for assigning one of the following four sets to a set of the eight ternary signals of length 2 ((0, 0), (0, 1), (0, 2), (1, 0), (1, 1), (1, 2), (2, 0) and (2, 1)) with the eight binary signals of length 3 as a set:
((0, 0, 0), (0, 0, 1), (0, 1, 1), (1, 1, 0), (1, 1, 1), (0, 1, 0), (1, 0, 0) and (1, 0, 1)),
((0, 0, 0), (0, 0, 1), (0, 1, 0), (1, 1, 0), (1, 1, 1), (0, 1, 1), (1, 0, 0) and (1, 0, 1)),
((0, 0, 0), (0, 1, 1), (0, 0, 1), (1, 0, 0), (1, 1, 1), (1, 0, 1), (0, 1, 0) and (1, 1, 0)) and
((0, 0, 0), (0, 1, 1), (0, 0, 1), (1, 0, 0), (1, 1, 1), (1, 0, 1), (1, 1, 0) and (0, 1, 0)).

18. The phase modulation method according to claim 17, wherein, according to the conversion rule of the four sets, the data conversion process for converting from the binary signal of length 3 to the ternary signal of length 2 adds the binary signals of length 3 (v2, v1, v0) [(v2, v1, v0) is one of (0, 0, 1), (0, 1, 0), (0, 1, 1), (1, 0, 0), (1, 0, 1), (1, 1, 0) and (1, 1, 1)] to the binary signals of length 3 (b2, b1, b0) respectively to assign each bit as (b2+v2, b1+v1, b0+v0) (symbol of operation + is an exclusive OR) to the ternary signals of length 2 ((0, 0), (0, 1), (0, 2), (1, 0), (1, 1), (1, 2), (2, 0) and (2, 1) so as to convert the binary signals of length 3 to the ternary signals of length 2.

19. The phase modulation method according to claim 18, wherein, as the conversion rule for converting between the ternary signals of length 2 and the binary signals of length 3 according to the conversion rule of the four sets, the data conversion process replaces each bit of the binary signals (b2, b1, b0) as to the thirty-two sets converted from the binary signals of length 3 to the ternary signals of length 2 with the four sets to assign each bit as (b2, b0, b1), (b1, b0, b2), (b1, b2, b0), (b0, b0, b2) and (b0, b2, b1) to the ternary signals of length 2 ((0, 0), (0, 1), (0, 2), (1, 0), (1, 1), (1, 2), (2, 0) and (2, 1) so as to convert the binary signals of length 3 to the ternary signals of length 2.

20. A modulation and demodulation system for having data conversion for converting a binary signal of length 5 to a senary signal of length 2 performed by a modulator in order to send the binary signal as a senary phase modulation signal and having the senary phase modulation signal received and inversely converted by a demodulator to the binary signal before the conversion by the modulator, wherein:
means for performing the data conversion has conversion means for converting a binary signal of length 3 to a ternary signal of length 2;
first to sixth phases are expressed as (B, T) by using binary signal B and ternary signal T, which are (0, 0), (0, 1), (0, 2), (1, 2), (1, 1) and (1, 0) respectively; and
the ternary signals of length 2 are annularly arranged to be an error of a Lee distance 1 in every adjacent combination, and the binary signals of length 3 are associated with the ternary signals of length 2 so as to render a Hamming distance between the binary signals of length 3 as 1; and
the means for performing the data conversion converts the binary signal of length 5 to the senary signal of length 2 by using a correspondence between the binary signal of length 3 and the ternary signal of length 2.

21. The modulation and demodulation system according to claim 20, wherein the conversion means converts the binary signal of length 3 to the ternary signal of length 2 as a correspondence between the binary signal of length 3 and the ternary signal of length 2 according to a conversion rule for assigning one of the following two sets to a set of the eight ternary signals of length 2 ((0, 0), (0, 1), (0, 2), (1, 2), (2, 2), (2, 1), (2, 0) and (1, 0)) with the eight binary signals of length 3 as a set:

((0, 0, 0), (0, 0, 1), (0, 1, 1), (0, 1, 0), (1, 1, 0), (1, 1, 1), (1, 0, 1) and (1, 0, 0)) and ((0, 0, 0), (1, 0, 0), (1, 0, 1), (1, 1, 1), (1, 1, 0), (0, 1, 0), (0, 1, 1) and (0, 0, 1)).

22. The modulation and demodulation system according to claim 21, wherein, according to the conversion rule, the conversion means adds the binary signals of length 3 (v2, v1, v0) [(v2, v1, v0) is one of (0, 0, 1), (0, 1, 0), (0, 1, 1), (1, 0, 0), (1, 0, 1), (1, 1, 0) and (1, 1, 1)] to the binary signals of length 3 (b2, b1, b0) respectively to assign each bit as (b2+v2, b1+v1, b0+v0) (symbol of operation + is an exclusive OR) to the senary signals of length 2 (0, 0), (0, 1), (0, 2), (1, 2), (2, 2), (1, 2), (0, 2) and (0, 1) so as to convert the binary signals of length 3 to the ternary signals of length 2 according to the conversion rule.

23. The modulation and demodulation system according to claim 22, wherein, according to the conversion rule, the conversion means replaces each bit of the binary signals (b2, b1, b0) to assign each bit as (b2, b0, b1), (b1, b0, b2), (b1, b2, b0), (b0, b0, b2) and (b0, b2, b1) to sixteen sets converted from the binary signals of length 3 to the ternary signals of length 2 so as to convert the binary signals of length 3 to the ternary signals of length 2 according to the conversion rule.

24. A modulator used for a modulation and demodulation system for having data conversion for converting a binary signal of length 5 to a senary signal of length 2 performed by a modulator in order to send the binary signal as a senary phase modulation signal and having the senary phase modulation signal received and inversely converted by a demodulator to the binary signal before the conversion by the modulator, wherein:

means for performing the data conversion has conversion means for converting a binary signal of length 3 to a ternary signal of length 2;

first to sixth phases are expressed as (B, T) by using binary signal B and ternary signal T, which are (0, 0), (0, 1), (0, 2), (1, 2), (1, 1) and (1, 0) respectively;

the ternary signals of length 2 are annularly arranged to be an error of a Lee distance 1 in every adjacent combination, and the binary signals of length 3 are associated with the ternary signals of length 2 so as to render a Hamming distance between the binary signals of length 3 as 1; and the means for performing the data conversion converts the binary signal of length 5 to the senary signal of length by using a correspondence between the binary signal of length and the ternary signal of length 2.

25. The modulator according to claim 24, wherein the data conversion means converts the binary signal of length 3 to the ternary signal of length 2 as a correspondence between the binary signal of length 3 and the ternary signal of length 2 according to a conversion rule for assigning one of the following two sets to a set of the eight ternary signals of length 2 ((0, 0), (0, 1), (0, 2), (1, 2), (2, 2), (2, 1), (2, 0) and (1, 0)) with the eight binary signals of length 3 as a set:

((0, 0, 0), (0, 0, 1), (0, 1, 1), (0, 1, 0), (1, 1, 0), (1, 1, 1), (1, 0, 1) and (1, 0, 0)) and ((0, 0, 0), (1, 0, 0), (1, 0, 1), (1, 1, 1), (1, 1, 0), (0, 1, 0), (0, 1, 1) and (0, 0, 1)).

26. The modulator according to claim 25, wherein, according to the conversion rule, the data conversion means adds the binary signals of length 3 (v2, v1, v0) [(v2, v1, v0) is one of (0, 0, 1), (0, 1, 0), (0, 1, 1), (1, 0, 0), (1, 0, 1), (1, 1, 0) and (1, 1, 1)] to the binary signals of length 3 (b2, b1, b0) respectively to assign each bit as (b2+v2, b1+v1, b0+v0) (symbol of operation + is an exclusive OR) to the senary signals of length 2 (0, 0), (0, 1), (0, 2), (1, 2), (2, 2), (1, 2), (0, 2) and (0, 1) so as to convert the binary signals of length 3 to the ternary signals of length 2 according to the conversion rule.

27. The modulator according to claim 26, wherein, according to the conversion rule, the conversion means replaces each bit of the binary signals (b2, b1, b0) to assign each bit as (b2, b0, b1), (b1, b0, b2), (b1, b2, b0), (b0, b0, b2) and (b0, b2, b1) to the sixteen sets converted from the binary signals of length 3 to the ternary signals of length 2 so as to convert the binary signals of length 3 to the ternary signals of length 2 according to the conversion rule.

28. A demodulator used for a modulation and demodulation system for having data conversion for converting a binary signal of length 5 to a senary signal of length 2 performed by a modulator in order to send the binary signal as a senary phase modulation signal and having the senary phase modulation signal received and inversely converted by the demodulator to the binary signal before the conversion by the modulator, wherein:

means for inversely converting the senary phase modulation signal to the binary signal includes conversion means for converting a ternary signal of length 2 to a binary signal of length 3;

first to sixth phases are expressed as (B, T) by using binary signal B and ternary signal T, which are (0, 0), (0, 1), (0, 2), (1, 2), (1, 1) and (1, 0) respectively;

the ternary signals of length 2 are annularly arranged to be an error of a Lee distance 1 in every adjacent combination, and the binary signals of length 3 are associated with the ternary signals of length 2 so as to render a Hamming distance between the binary signals of length 3 as 1; and the means for inversely converting the senary phase modulation signal to the binary signal inversely converts the senary phase modulation signal to the binary signal before the conversion by the modulator by using a correspondence between the binary signal of length 3 and the ternary signal of length 2.

29. The demodulator according to claim 28, wherein the data conversion means converts the ternary signal of length 2 to the binary signal of length 3 as a correspondence between the binary signal of length 3 and the ternary signal of length 2 according to a conversion rule for assigning one of the following two sets to a set of the eight ternary signals of length 2 ((0, 0), (0, 1), (0, 2), (1, 2), (2, 2), (2, 1), (2, 0) and (1, 0)) with the eight binary signals of length 3 as a set:

((0, 0, 0), (0, 0, 1), (0, 1, 1), (0, 1, 0), (1, 1, 0), (1, 1, 1), (1, 0, 1) and (1, 0, 0)) and ((0, 0, 0), (1, 0, 0), (1, 0, 1), (1, 1, 1), (1, 1, 0), (0, 1, 0), (0, 1, 1) and (0, 0, 1)).

30. The demodulator according to claim 29, wherein, according to the conversion rule, the data conversion means adds the binary signals of length 3 (v2, v1, v0) [(v2, v1, v0) is one of (0, 0, 1), (0, 1, 0), (0, 1, 1), (1, 0, 0), (1, 0, 1), (1, 1, 0) and (1, 1, 1)] to the binary signals of length 3 (b2, b1, b0) respectively to assign each bit as (b2+v2, b1+v1, b0+v0) (symbol of operation + is an exclusive OR) to the senary signals of length 2 (0, 0), (0, 1), (0, 2), (1, 2), (2, 2), (1, 2), (0, 2) and (0, 1) so as to convert the ternary signals of length 2 to the binary signals of length 3 according to the conversion rule.

31. The demodulator according to claim 30, wherein, according to the conversion rule, the data conversion means replaces each bit of the binary signals (b2, b1, b0) to assign each bit as (b2, b0, b1), (b1, b0, b2), (b1, b2, b0), b0, b0, b2), (b0, b2, b1) to the sixteen sets converted from the binary signals of length 3 to the ternary signals of length 2 so as to convert the ternary signals of length to the binary signals of length 3 according to the conversion rule.

32. A phase modulation method used for a modulation and demodulation system having a senary signal phase-modulated and outputted by a modulator, and received and phase-modulated by a destination demodulator to a binary signal before conversion by the modulator, wherein the method comprising:
  implementing a data conversion process for converting a binary signal of length 5 to a senary signal of length 2 using the modulator, wherein;
  the data conversion process includes a conversion process for converting a binary signal of length 3 to a ternary signal of length 2;
  first to sixth phases are expressed as (B, T) by using binary signal B and ternary signal T, which are (0, 0), (0, 1), (0, 2), (1, 2), (1, 1) and (1, 0) respectively;
  the ternary signals of length 2 are annularly arranged to be an error of a Lee distance 1 in every adjacent combination, and the binary signals of length 3 are associated with the ternary signals of length 2 so as to render a Hamming distance between the binary signals of length 3 as 1; and
  the data conversion process converts the binary signal of length 5 to the senary signal of length by using a correspondence between the binary signal of length 3 and the ternary signal of length 2.

33. The phase modulation method according to claim 32, wherein the data conversion process converts the binary signal of length 3 to the ternary signal of length 2 as a correspondence between the binary signal of length 3 and the ternary signal of length 2 according to a conversion rule for assigning one of the following two sets to a set of the eight ternary signals of length 2 ((0, 0), (0, 1), (0, 2), (1, 0), (1, 1), (1, 2), (2, 0) and (2, 1)) with the eight binary signals of length 3 as a set:
  ((0, 0, 0), (0, 0, 1), (0, 1, 1), (0, 1, 0), (1, 1, 0), (1, 1, 1), (1, 0, 1) and (1, 0, 0)) and
  ((0, 0, 0), (1, 0, 0), (1, 0, 1), (1, 1, 1), (1, 1, 0), (0, 1, 0), (0, 1, 1) and (0, 0, 1)).

34. The phase modulation method according to claim 33, wherein, according to the conversion rule, the data conversion process adds the binary signals of length 3 (v2, v1, v0) [(v2, v1, v0) is one of (0, 0, 1), (0, 1, 0), (0, 1, 1), (1, 0, 0), (1, 0, 1), (1, 1, 0) and (1, 1, 1)] to the binary signals of length 3 (b2, b1, b0) respectively to assign each bit as (b2+v2, b1+v1, b0+v0) (symbol of operation + is an exclusive OR) to the senary signals of length 2 (0, 0), (0, 1), (0, 2), (1, 0), (1, 1), (1, 2), (2, 0) and (2, 1) so as to convert the binary signals of length 3 to the ternary signals of length 2 according to the conversion rule.

35. The phase modulation method according to claim 34, wherein, according to the conversion rule, the data conversion process replaces each bit of the binary signals (b2, b1, b0) to assign each bit as (b2, b0, b1), (b1, b0, b2), (b1, b2, b0), (b0, b0, b2), (b0, b2, b1) to the sixteen sets converted from the binary signals of length 3 to the ternary signals of length 2 so as to convert the binary signals of length 3 to the ternary signals of length 2 according to the conversion rule.

36. A phase demodulation method used for a modulation and demodulation system having data conversion for converting a binary signal of length 5 to a senary signal of length 2 performed by a modulator in order to send the binary signal as a senary phase modulation signal and having the senary phase modulation signal received and inversely converted by a demodulator to the binary signal before the conversion by the modulator, the method comprising:
  implementing an inverse conversion process for inversely converting the senary phase modulation signal to the binary signal before the conversion by the modulator;
  the inverse conversion process includes a conversion process for converting a ternary signal of length 2 to a binary signal of length 3;
  first to sixth phases are expressed as (B, T) by using binary signal B and ternary signal T, which are (0, 0), (0, 1), (0, 2), (1, 2), (1, 1) and (1, 0) respectively;
  the ternary signals of length 2 are annularly arranged to be an error of a Lee distance 1 in every adjacent combination, and the binary signals of length 3 are associated with the ternary signals of length 2 so as to render a Hamming distance between the binary signals of length 3 as 1; and
  the inverse conversion process inversely converts the senary phase modulation signal to the binary signal before the conversion by the modulator by using a correspondence between the binary signal of length 3 and the ternary signal of length 2.

37. The phase demodulation method according to claim 36 wherein the inverse conversion process converts the ternary signal of length 2 to the binary signal of length 3 as a correspondence between the binary signal of length 3 and the ternary signal of length 2 according to a conversion rule for assigning one of the following two sets to a set of the eight ternary signals of length 2 ((0, 0), (0, 1), (0, 2), (1, 0), (1, 1), (1, 2), (2, 0) and (2, 1)) with the eight binary signals of length 3 as a set:
  ((0, 0, 0), (0, 0, 1), (0, 1, 1), (0, 1, 0), (1, 1, 0), (1, 1, 1), (1, 0, 1) and (1, 0, 0)) and
  ((0, 0, 0), (1, 0, 0), (1, 0, 1), (1, 1, 1), (1, 1, 0), (0, 1, 0), (0, 1, 1), (0, 0, 1)).

38. The phase demodulation method according to claim 37, wherein, according to the conversion rule, the inverse conversion process adds the binary signals of length 3 (v2, v1, v0) [(v2, v1, v0) is one of (0, 0, 1), (0, 1, 0), (0, 1, 1), (1, 0, 0), (1, 0, 1), (1, 1, 0) and (1, 1, 1)] to the binary signals of length 3 (b2, b1, b0) respectively to assign each bit as (b2+v2, b1+v1, b0+v0) (symbol of operation + is an exclusive OR) to the senary signals of length 2 (0, 0), (0, 1), (0, 2), (1, 0), (1, 1), (1, 2), (2, 0) and (2, 1) so as to convert the ternary signals of length 2 to the binary signals of length 3 according to the conversion rule.

39. The phase demodulation method according to claim 38, wherein, according to the conversion rule, the inverse conversion process replaces each bit of the binary signals (b2, b1, b0) to assign each bit as (b2, b0, b1), (b1, b0, b2), (b1, b2, b0), (b0, b0, b2), and (b0, b2, b1) to the sixteen sets converted from the binary signals of length 3 to the ternary signals of length 2 so as to convert the ternary signals of length 2 to the binary signals of length 3 according to the conversion rule.

* * * * *